(12) United States Patent
Clemens et al.

(10) Patent No.: US 11,057,612 B1
(45) Date of Patent: Jul. 6, 2021

(54) GENERATING COMPOSITE STEREOSCOPIC IMAGES USUALLY VISUALLY-DEMARKED REGIONS OF SURFACES

(71) Applicant: Tanzle, Inc., Scotts Valley, CA (US)

(72) Inventors: Nancy L. Clemens, Scotts Valley, CA (US); Michael A. Vesely, Scotts Valley, CA (US)

(73) Assignee: Tanzle, Inc., Scotts Valley, CA (US)

(*) Notice: Subject to any disclaimer, the term of this patent is extended or adjusted under 35 U.S.C. 154(b) by 0 days.

(21) Appl. No.: 17/125,798

(22) Filed: Dec. 17, 2020

Related U.S. Application Data

(63) Continuation of application No. 17/092,172, filed on Nov. 6, 2020.

(Continued)

(51) Int. Cl.
```
H04N 13/361    (2018.01)
G06T 19/00     (2011.01)
H04N 13/204    (2018.01)
G06T 7/73      (2017.01)
H04N 13/275    (2018.01)
G06F 3/0346    (2013.01)
```
(Continued)

(52) U.S. Cl.
CPC ......... *H04N 13/361* (2018.05); *G06F 3/0346* (2013.01); *G06T 7/73* (2017.01); *G06T 19/003* (2013.01); *H04N 13/204* (2018.05); *H04N 13/275* (2018.05); *G06F 3/041* (2013.01); *G06T 2200/24* (2013.01); *G06T 2207/10012* (2013.01); *G06T 2207/30244* (2013.01); *G06T 2219/028* (2013.01); *H04N 2013/0074* (2013.01)

(58) Field of Classification Search
None
See application file for complete search history.

(56) References Cited

U.S. PATENT DOCUMENTS 5,574,836 A * 11/1996 Broemmelsiek ........ G06F 3/012
345/427
8,469,261 B2 * 6/2013 Bonner .................... G06K 9/00
235/375

(Continued)

OTHER PUBLICATIONS

Lu et al., *A Survey of Motion-Parallax-Based 3-D Reconstruction Algorithms*, IEEE Transactions on Systems, Man, and Cybernetics— Part C: Applications and Review, 2004, 34(4):532-548.

*Primary Examiner* — Hilina K Demeter
(74) *Attorney, Agent, or Firm* — Fish & Richardson P.C.

(57) ABSTRACT

A system, method or compute program product for generating composite images. One of the systems includes a capture device to capture an image of a physical environment; and one or more storage devices storing instructions that are operable, when executed by one or more processors of the system, to cause the one or more processors to: obtain an image of the physical environment as captured by the capture device, identify a visually-demarked region on a surface in the physical environment as depicted in the image, process the image to generate a composite image of the physical environment that includes a depiction of a virtual object, wherein a location of the depiction of the virtual object in the composite image is based on a location of the depiction of the visually-demarked region in the image, and cause the composite image to be displayed for a user.

23 Claims, 13 Drawing Sheets

Related U.S. Application Data

(60) Provisional application No. 62/932,873, filed on Nov. 8, 2019, provisional application No. 62/933,269, filed on Nov. 8, 2019, provisional application No. 62/933,214, filed on Nov. 8, 2019.

(51) Int. Cl.
*H04N 13/00* (2018.01)
*G06F 3/041* (2006.01)

(56) References Cited

U.S. PATENT DOCUMENTS

| | | | |
|---|---|---|---|
| 9,266,017 | B1 | 2/2016 | Parker et al. |
| 10,007,350 | B1 * | 6/2018 | Holz .................. G06T 7/246 |
| 2005/0264558 | A1 * | 12/2005 | Vesely ............... G06F 3/0346 |
| | | | 345/419 |
| 2010/0020068 | A1 * | 1/2010 | House ................ G06T 15/20 |
| | | | 345/419 |
| 2011/0074918 | A1 * | 3/2011 | Klappert ............ H04N 5/2628 |
| | | | 348/43 |
| 2013/0182225 | A1 | 7/2013 | Stout |
| 2014/0118506 | A1 | 5/2014 | Uhl |
| 2014/0306995 | A1 | 10/2014 | Raheman et al. |
| 2015/0054823 | A1 | 2/2015 | Dzhurinskiy et al. |
| 2015/0348326 | A1 | 12/2015 | Sanders et al. |
| 2018/0205940 | A1 | 7/2018 | Donovan |
| 2018/0293041 | A1 * | 10/2018 | Harviainen .......... H04N 13/344 |
| 2019/0058873 | A1 * | 2/2019 | Kosmiskas .......... H04N 13/156 |
| 2019/0102949 | A1 | 4/2019 | Sheftel et al. |
| 2019/0370994 | A1 * | 12/2019 | Norris .................. G06T 7/73 |

\* cited by examiner

GENERATING COMPOSITE STEREOSCOPIC IMAGES USUALLY VISUALLY-DEMARKED REGIONS OF SURFACES

CROSS-REFERENCE TO RELATED APPLICATIONS

This application is a continuation application of, and claims priority to, U.S. patent application Ser. No. 17/092,172, filed on Nov. 6, 2020, which claims priority to U.S. Application No. 62/932,873, filed on Nov. 8, 2019, U.S. Application No. 62/933,269, filed on Nov. 8, 2019, and U.S. Application No. 62/933,214, filed on Nov. 8, 2019, the disclosures of which are hereby incorporated by reference.

BACKGROUND

Technical Field

This disclosure relates to a display system, and in particular to a system that generates and displays composite stereoscopic images.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g., paintings, drawings, tapestries, etc.).

The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

A planar stereoscopic display, e.g., a LCD-based or a projection-based display, shows two images with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information.

SUMMARY

This specification describes a computer system that processes an initial image of an environment to generate a composite image of the environment, and displays the composite image on a display device.

In particular, the initial image depicts a physical environment that includes a surface. The surface can include a physically visually-demarked region. That is, a region of the surface is visibly-demarked in the physical environment; for example, the region can be a different color than the rest of the surface, have an outline that demarcates the boundaries of the region from the rest of the surface, and/or be on a platform that is a different elevation than the rest of the surface. As a particular example, the surface can be a table top, and the visually-demarked region a portion of the table top.

The system can determine a portion of the initial image that depicts the visually-demarked region of the surface. For example, the system can process the initial image using one or more machine learning models that have been configured through training to identify visually-demarked regions in images. As another example, a tracking system can track the location and orientation, in a common three-dimensional coordinate system of the physical environment, of i) the visually demarked region and ii) the capture device that captured the initial image. The system can then determine, according to the respective location and orientations, the portion of the initial image that depicts the visually-demarked region.

The system can then process the initial image to generate the composite image, including rendering a virtual object within or proximate to the visually-demarked region. For example, the virtual object can be on top of or below the visually demarked region from the perspective of the composite image.

Particular embodiments of the subject matter described in this specification can be implemented so as to realize one or more of the following advantages.

In many cases, when generating a composite image for display to a user, e.g., a composite image that that depicts a physical environment with one or more virtual objects in the physical environment, it can be helpful to the user to render the virtual object in relation to real-world physical reference points. For example, it may be disorienting or jarring for the user if the composite images include virtual objects floating in space or seemingly-randomly imposed onto the physical environment of the user. Using techniques described in this specification, a system can render virtual objects to be within or proximate to physical, real-world reference points that are visible to a user, thus creating a more realistic and/or comfortable experience for the user.

Furthermore, using techniques described in this specification, users can use any visually-demarked region of any surface as a reference point for composite images. For example, a user can place a piece of paper or a piece of cardboard onto a surface, e.g., a desk or a table, and identify the piece of paper or cardboard to the system as a reference point according to which the system should render virtual objects. Thus, the user does not need to purchase expensive specialty hardware to act as the reference points in order to enjoy an intuitive virtual experience.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
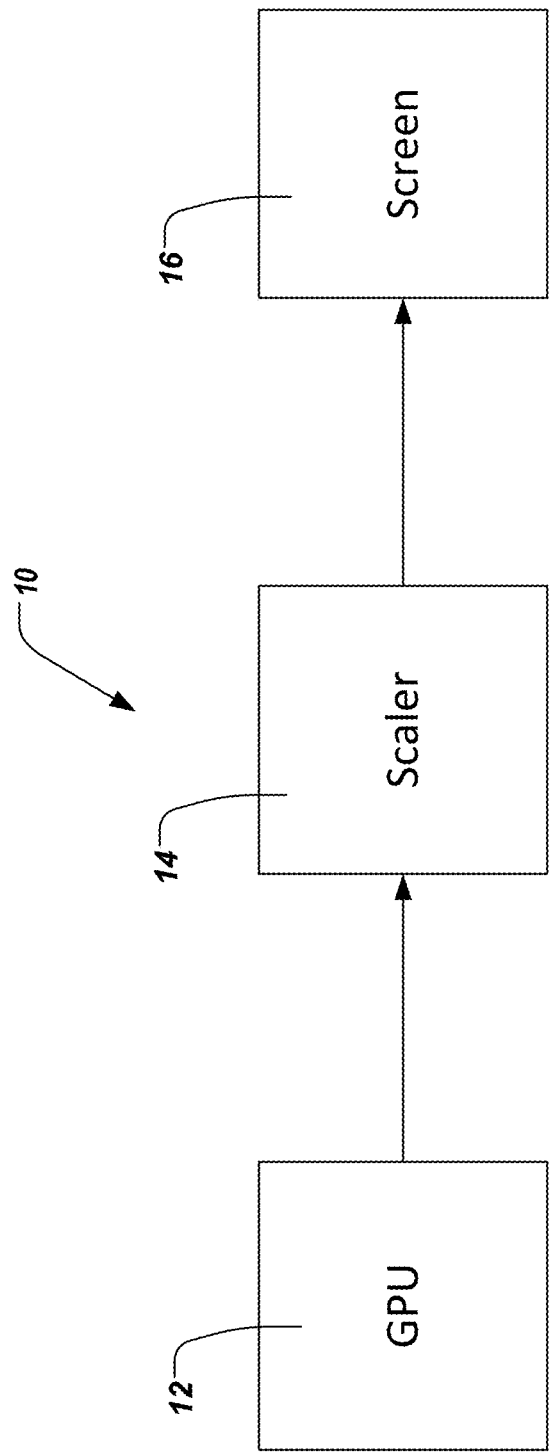
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panel. The panel 16 is the display screen itself. In some implementations, the panel 16 can be a liquid crystal display (LCD) screen. In some other implementations, the panel 16 can be a component of eyewear that a user can wear. Other display screens are possible.

Time Sequential Stereo Displays

Unlike a normal display, in a stereo display, there are two images—right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
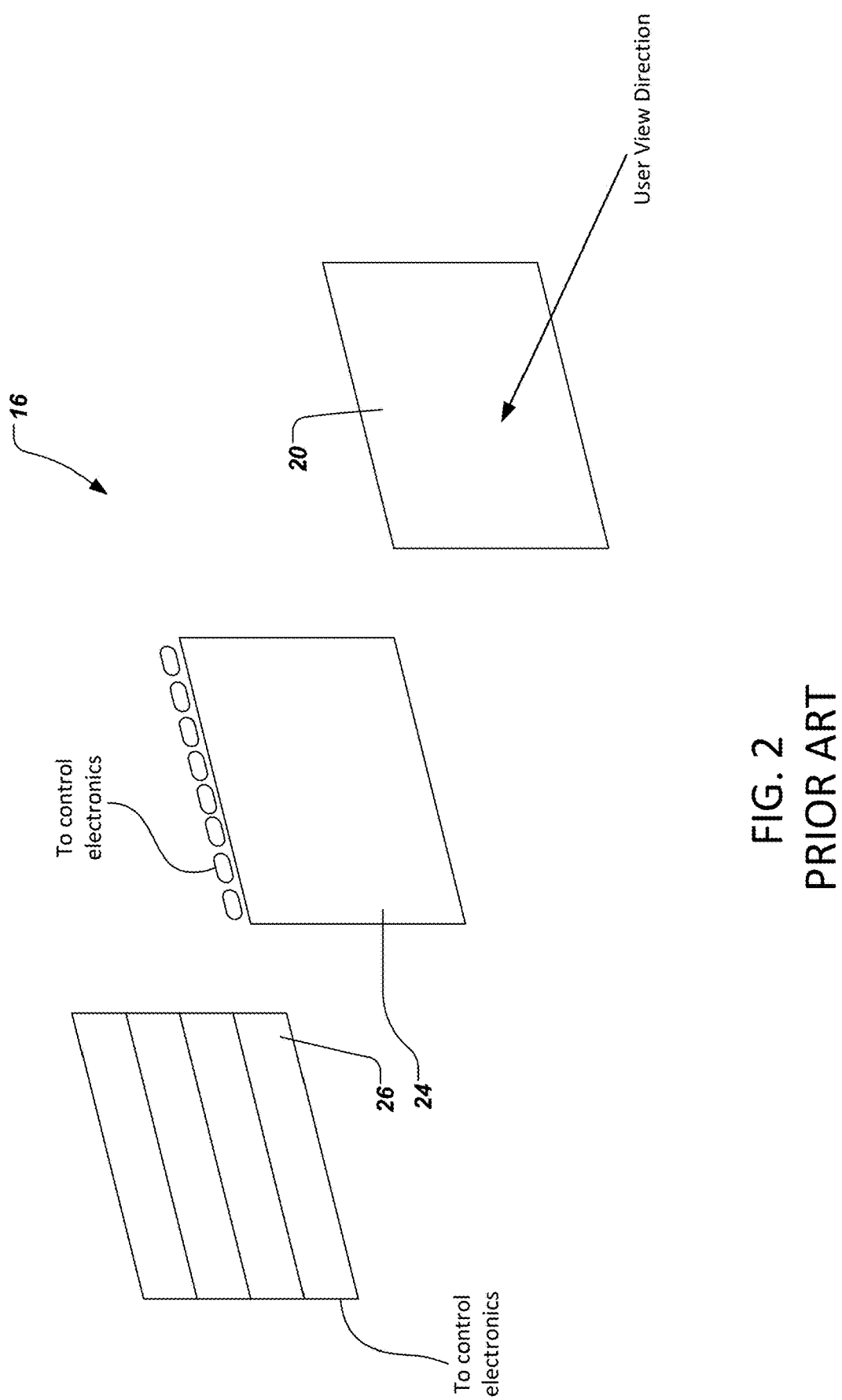
FIG. 2 presents a prior art polarization switch architecture.

The first architecture, shown in FIG. 2, uses a device called a polarization switch (PS) 20 which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3A:
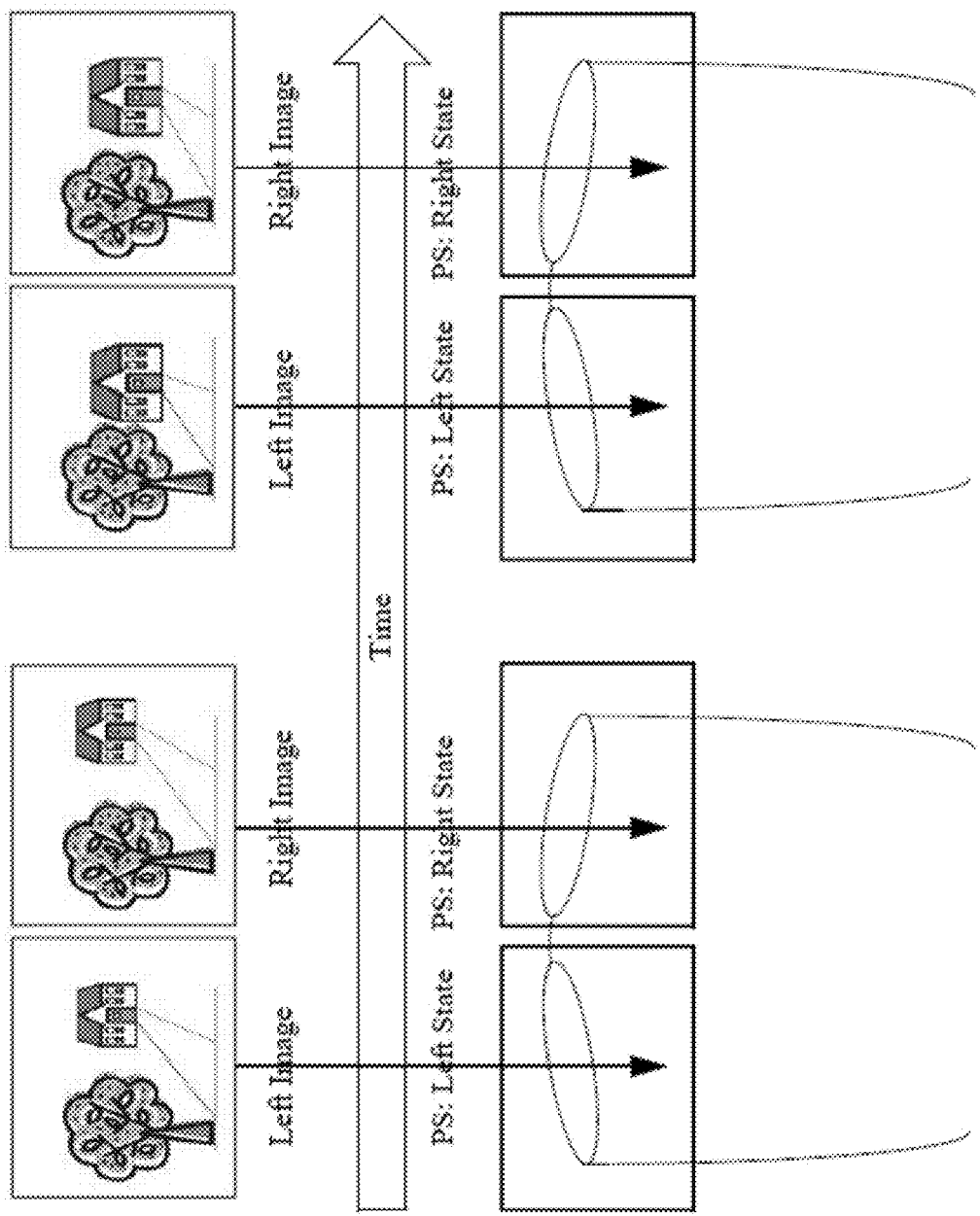
FIG. 3A presents prior art left and right switching views causing a stereo 3D effect.

This allows achievement of the stereo effect shown in FIG. 3A. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Figure 3B:
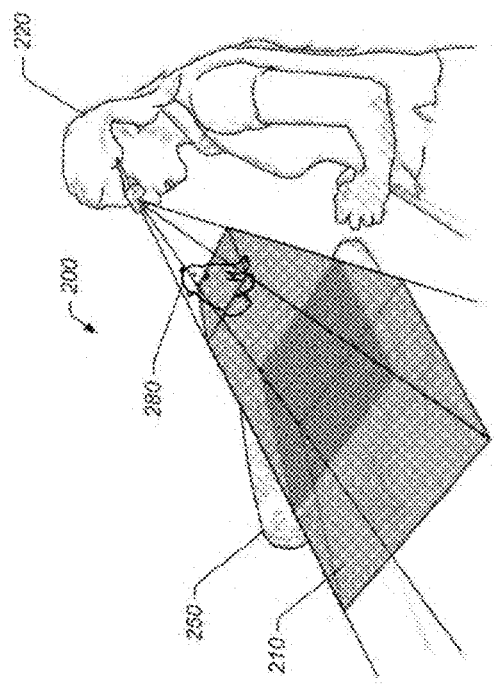
FIGS. 3B, 3C, and 3D present prior art stereoscopic displays.

As illustrated in FIG. 3B, in an example embodiment, a 3D stereoscopic display system 200, which may be similar to or the same as system 100 described above, may be configured to display 3D stereoscopic content 280 within a stereo comfort fuse zone 210 using 3D stereoscopic display 250. As used herein, the term stereo comfort fuse zone refers to a physical volume in which the user, such as user 220, of a 3D stereoscopic display can view 3D content, such as content 280, within the human eye's comfortable fusing volume. The stereo comfort fuse zone may extend to both the front of, or above the 3D stereoscopic display 250 and the inner volume (behind, or below the 3D stereoscopic display 250). In such embodiments, a functional unit of display system 200 may be configured to determine the geometry, i.e., the size and shape, of stereo comfort fuse zone 210 of 3D stereoscopic display 250. Note that Stereo comfort fuse zone 210 may include a physical volume that may be specified by the depth of field of user 220 with respect to the position of 3D stereoscopic display 250 and the point of view, or eyepoint, of user 220. Note further that the physical volume of the Stereo comfort fuse zone 220 may correspond to at least a portion of a virtual 3D space that may be displayed or rendered using 3D stereoscopic display system 200. The stereo comfort fuse zone may be further determined by the size of the display, the resolution of the display, the dynamic range and/or contrast ratio of the display, the stereo ghosting characteristics of the display as well as the physiological characteristics of the user.

Figure 3C:
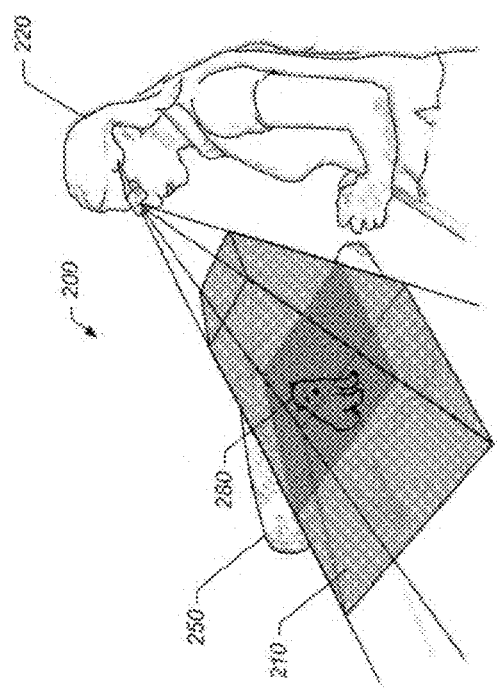
Figure 3D:
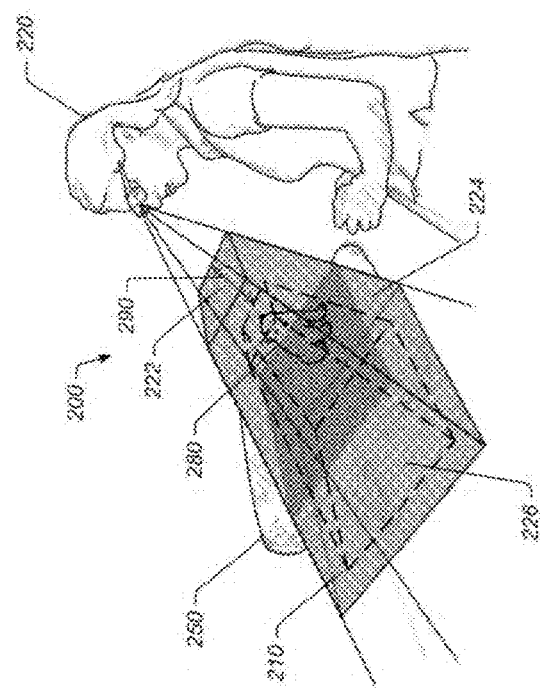

Thus, as shown in FIG. 3B, the functional unit of 3D stereoscopic display system 200 may be configured to display content 280 at a first position in the virtual 3d space relative to eyepoint, or point of view, of user 220. Note that the first position may correspond to a position within the stereo comfort fuse zone as illustrated. In certain embodiments the functional unit may be configured to determine that content 280, or a portion of content 280, is not contained, or is not completely within, the stereo comfort fuse zone 220 as shown in FIG. 3C. In some embodiments, the functional unit may be configured to determine that the content 280, or a portion of content 280, is within a specified distance, such as distance 290, from a boundary, such as boundaries 222-226 (note that not all boundaries are labeled) of the stereo comfort fuse zone 220 as shown in FIG. 3D.

There are a number of contributors enabling a user to perceive a spatial scene using a mono or stereo display for user viewing. In the stereo display by using two distinct eye-points for capturing a scene to be displayed to a user with alternate left right imagery, a stereo image is produced. However when presenting objects within this imagery, where the objects depending upon the perceptual recognition of spatial variance, by using the disparity between the two images or at least the disparity between images of the objects within the scene, the depth information is presented to the user.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices. The display may include a single camera within a mono display device or a dual camera for a stereo display device. The camera system is particularly envisioned on a portable display device, with a handheld, head mounted, or glasses device. The camera(s) would be located within the display device to peer out in the proximity of what the user of the display device might see; that is, facing the opposite direction of the display surface, Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

Viewpoint ("perspective")—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes) of a scene seen from a point (or two points) in space. Thus, viewpoint may refer to the view from a single eye, or 25 may refer to the two points of view from a pair of eyes. A "single viewpoint" may specify that the viewpoint refers to only a single point of view and a "dual viewpoint", "paired viewpoint", or "stereoscopic viewpoint" may specify that the viewpoint refers to two points of view (and not one).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers the display of a 3D object, or content, on a two dimensional (2D) rendering presented on a display. Thus, a projection may be described as the mathematical function generally in the form of a function applied to objects within a virtual 3D scene to determine the virtual position, size, and orientation of the objects within a 3D scene that is presented on the 3D stereoscopic display from the perspective of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Example Systems

This specification describes a system that obtains an initial image of a physical environment, identifies a portion of the initial image that depicts a physically visually-demarked region of a surface in the physical environment, and renders a composite image that includes one or more virtual objects within or proximate to the visually-demarked regions of the surface. The system can then provide the composite image to a display device that displays the composite image to a user. The composite image can be a stereoscopic image; that is, the composite image can include two images that are to be displayed to the right eye and left eye, respectively, of the user.

In some implementations, the system can continuously obtain initial images of the environment to generate composite images and display the composite images for the user in real time, so that it appears, from the perspective of the user, as if the user is within or otherwise viewing the environment depicted in the composite image, i.e., the physical environment that includes the one or more virtual objects.

In some implementations, a pointer can be used by a user to interact with the virtual object and/or the visually-demarked regions. In some cases, the pointer is passive and the position of the pointer is tracked, e.g., by a camera. In this case, the pointer could be a stylus, a finger, or a thimble. In other cases, the pointer can be a pointing device; i.e., the system includes a pointing device equipped with active tracking components, e.g., radio-frequency (RF) transceivers, accelerometers, gyros and/or infrared (IR) sources, that aid with tracking the pointing device. For example, the pointing device can be a stylus with a tracking component, or a stylus with an attached camera. The system can track the pointer to determine the location/orientation of the pointer (e.g., a 6 degrees-of-freedom point in a common coordinate system) as well as interactions between the pointer and the visually-demarked region.

For example, a user when using stereo vision display device, can use the pointer to select a virtual object, e.g., by placing the pointer proximate to (e.g., touching or within a threshold distance of) the rendering of the virtual object in the scene or proximate to (e.g., touching or within a threshold distance of) the visually-demarked region corresponding to the virtual object. As a particular example, the user can select a "user interface" virtual object that represents a virtual user interface depicted within a visually-demarked region. The virtual user interface object may be rendered such that is appears within the demarked region or in another implementation, the user interface may appear to extend above the demarked region.

Selecting the user interface virtual object can cause a new or updated second virtual object (i.e., that is different than the user interface virtual object) to be rendered within or proximate to the same visually-demarked region or another visually-demarked region. In this specification, a user "selects" a virtual object by submitting a user input to the system that includes data identifying the virtual object. The system can then update the rendering of the selected virtual object in the generated composite images, e.g., by bolding, highlighting, or otherwise indicating that the virtual object has been selected.

In some implementations, a visually-demarked region can be touch-enabled. For example, a touch-enabled device can surround the visually-demarked region, allowing a user to submit touch inputs within the entire visually-demarked region.

For example, a user can place his or her finger within the touch-enabled perimeter of a visually-demarked region that includes a user interface virtual object. The user can thus select a menu item of a user interface virtual object. The system can recognize the user's touch at a particular location that is associated with the menu item, and cause an action corresponding to the menu item to happen.

The touch-enabled perimeter can use one of many different touch-enabled technologies, e.g., infrared technology. In another implementation, the touch-enabled technology can be a 3D touch or gesture control technology. The touch-enabled control can also be a stylus-based touch system or use some other handheld device.

As another example, the system can determine a point within one of the visually-demarked regions at which the pointer is pointing using the relative positions and orientations of the visually-demarked regions and the pointing device. The system can then render an interaction of the pointer on the visually-demarked region, e.g., a mouse icon or a rendering of a laser pointer.

Figure 4A:
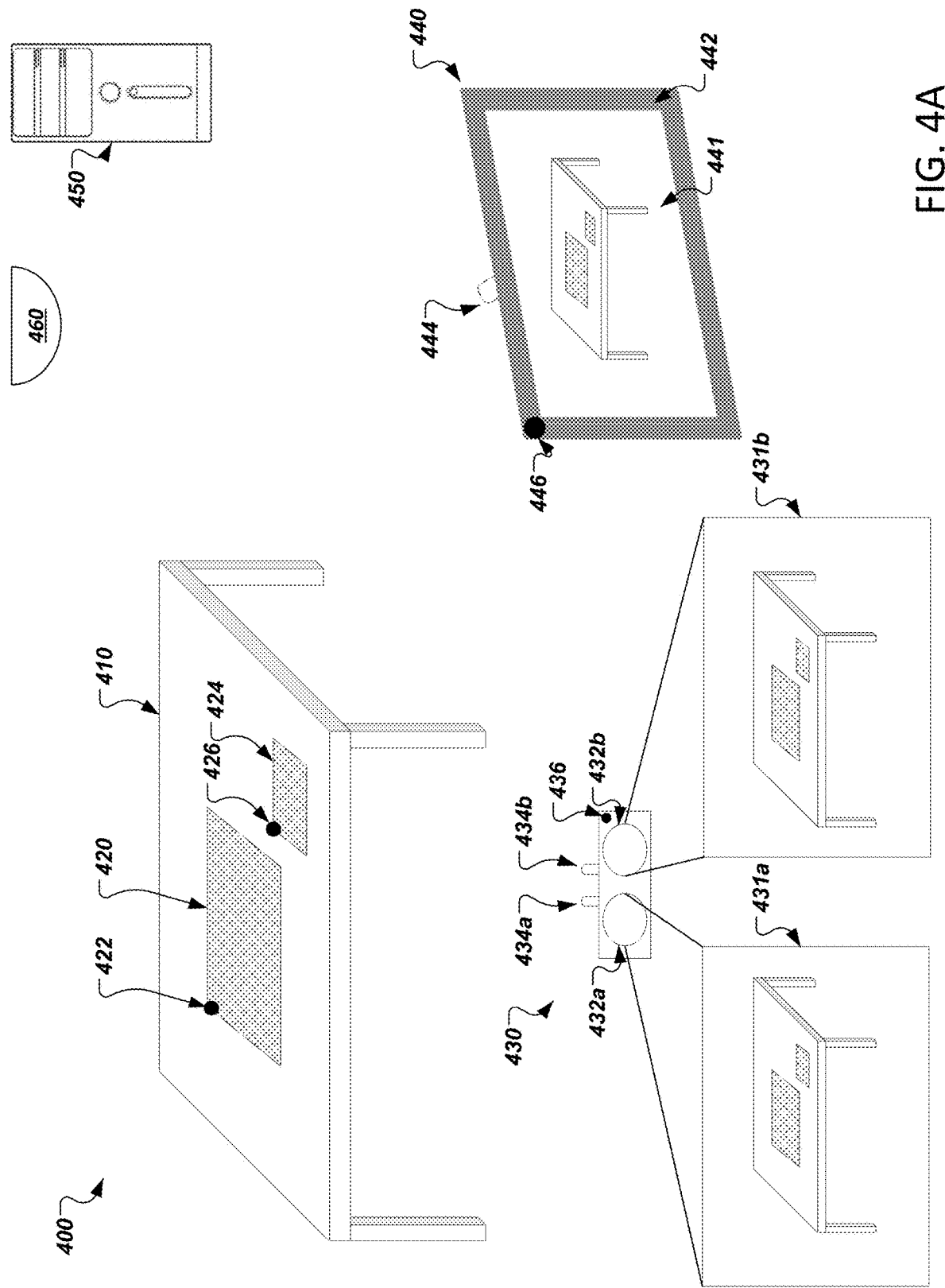
FIGS. 4A, 4B, and 4C present an example system with displays rendering images within a scene.
Figure 4B:
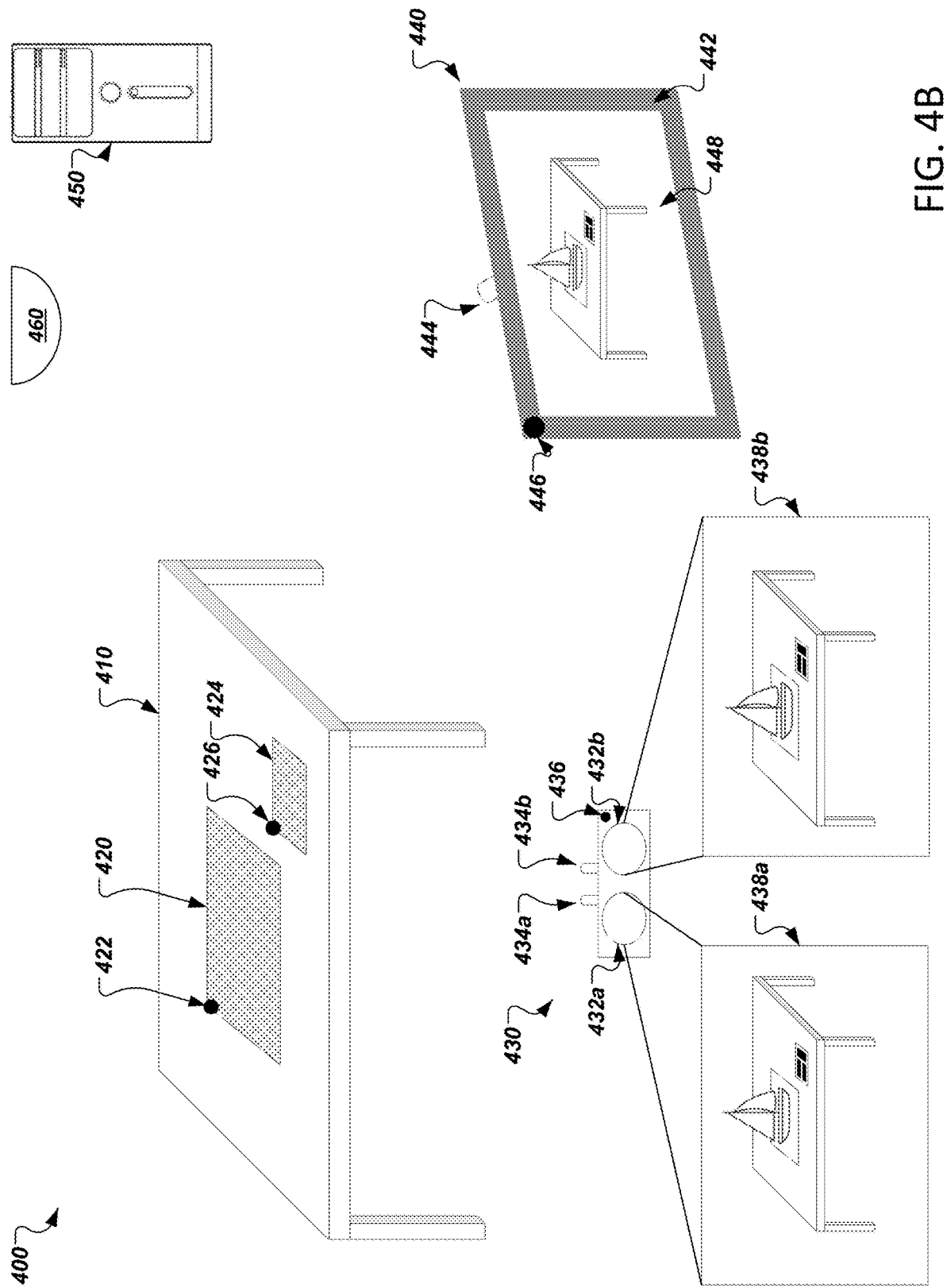
Figure 4C:
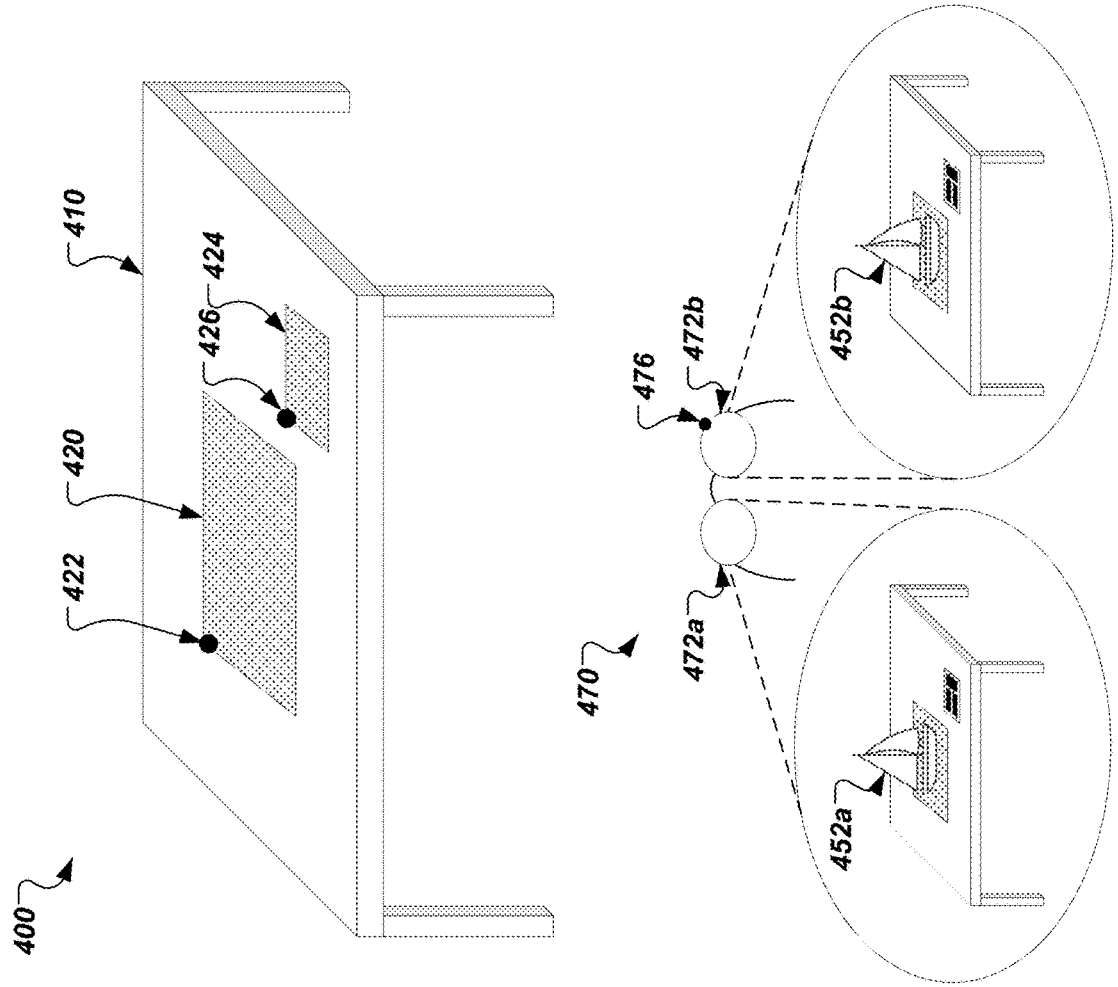

FIGS. 4A, 4B, and 4C illustrate an example system that may be configured to perform various embodiments described below.

FIG. 4A shows an example physical scene 400. The physical scene 400 includes a surface 400 (in this example, a table top) that includes two physically visually-demarked regions 420 and 424. Although two visually-demarked regions are depicted in FIG. 4A, generally a surface can include any number of visually-demarked regions, e.g., 1, 10, or 100. Further, although the surface 400 depicted in FIG. 4A is a flat surface, generally the surface can be any shape in three dimensions.

The regions 420 and 424 can be visually demarked by any appropriate means. For example, the regions 420 and 424 can be a different color than the rest of the surface 410. As another example, the bounds of the regions 420 and 424 can be outlined, e.g., by a visible line such as a line delineated by a piece of string or tape. As another example, the regions 420 and 424 can be elevated above or depressed into the surface 410; e.g., the region 420 and 424 can be on platforms raised above the surface 410. As another example, the regions 420 and 424 can be secondary surfaces placed on top of the surface 410, e.g., a piece of paper, cardboard, or canvas placed on top of the surface 410. In some implementations, the region 420 is visually demarked differently than the region 424; for example, the region 420 can be on an elevated platform while the region 424 is a different color than the rest of the surface 410. A demarked regions need not be, and typically is not, an active display; the demarked region can simply be a portion of an inactive surface such as a table, sheet of paper or cardboard, etc.

Images of the physical scene 400 can be captured by a first device 430 and/or a second device 440. For example, the first device 430 and/or the second device 440 can capture a still image of the scene 400 or a video of the scene 400 composed of multiple time-sequenced frames. The first device 430 and/or the second device 440 can also capture a laser or sonic scan of the scene 400.

A first initial image 431*a* and second initial image 431*b*, captured by the first device 430, and a third initial image 441, captured by the second device 440, depict the scene before the respective images are processed by a processing system 450 (in one implementation, an image processing system 450) to replace the portions of the initial images identified as depicting the visually-demarked regions 420 and 424 with a substitute rendering of one or more virtual objects.

The first device 430 is a stereoscopic device, i.e., the first device 430 captures images of the scene 400 and displays the images to a user in stereo. That is, the captured images are captured from two distinct perspectives, which are generally the perspective of each of the user's eyes. The first device 430 includes a first display 432*a* and a second display 432*b*. For example, the first device 430 can present the first display 432a, displaying images captured from a first perspective, to the left eye of the user and the second display 432b, displaying images captured from a second perspective, to the right eye of a user; for example, the first device 430 can be a head-mounted display. The space between the first display 432a and the second display 432b can correlate to the separation between the two eyes of the user, as reflected by the images captured from the two perspectives.

The first device 430 includes a first camera 434a and a second camera 434b. In some implementations, the first device 430 can have more than two cameras. The first camera 434a and the second camera 434b are separated by a distance on the first device 430 so that the two cameras can capture images of the scene 400 in stereo, correlating to the two perspectives of the displays 432a-b. In some implementations, the separation between the first camera 434a and the second camera 434b can approximately correlate to the distance between the two eyes of the user. In some implementations, the two cameras and the two displays have the same horizontal relationship to each other, e.g., a line connecting the first display 432a and the second display 432b can be parallel to a line connecting the first camera 434a and the second camera 434b.

The first initial image 431a depicts the scene 400 as it was captured by the first camera 434a. The first initial image 431a would have been displayed to the left eye of the user on the first display 432a if the first initial image 431a were not to be processed by the image processing system 450. The second initial image 431b depicts the scene 400 as it was captured by the second camera 434b. The second initial image 431b would have been displayed to the right eye of the user on the second display 432b if the second initial image 431b were not to be processed by the image processing system 450.

The second device 440 is a handheld device with a single display 442, i.e., the display 442 is monoscopic instead of stereoscopic. The second device 440 includes a camera 444. The third initial image 441 depicts the scene 400 as it was captured by the camera 444. The third initial image 441 would have been displayed on the display 442 if the third initial image 441 were not processed by the image processing system 450.

While the first device 430 both captures and displays images stereoscopically, and the second device 440 both captures and displays images monoscopically, in general a stereoscopic capture device can have a monoscopic display and a monoscopic capture device can have a stereoscopic display.

In some implementations, one device can capture images of the scene 400, and a different device can display the images. That is, the first device 430 can be composed of two different devices, one of which captures images and the other of which displays the images; the same is true of the second device 440.

The first device 430 and/or the second device 440 can send the respective initial captured images of scene 400 to the image processing system 450. In some implementations, the image processing system 450 is on-site, e.g., in the same room as the physical scene 400 and the devices 430 and 440. In some other implementations, the image processing system 450 can be on the cloud, i.e., off-site. In some other implementations, the image processing system 450 can be a component of the first device 430 and/or the second device 440. In other words, each of the devices can include a version of the image processing system 450, so that the initial images of the physical scene 400 can be processed on-device.

Portions of the initial images of the scene 400 depicting the visually-demarked regions 420 and 424 can be identified in initial images by the image processing system 450.

For example, the visually-demarked regions 420 and 424 can be a particular color. In this case, the image processing system 450 can store a predetermined color range for each color channel of the initial images, e.g., for each of the RGB channels. For each initial image, the image processing system 450 can identify the pixels in the initial image that have values within the ranges, and determine that the identified pixels depict the visually-demarked regions 420 and 424.

As another example, the visually-demarked regions 420 and 424 can have a particular shape that can be identified by the image processing system 550. For example, the image processing system 450 can apply a machine learning, e.g., a computer vision model configured through training to identify the shape in images, to identify the particular shape within the initial images.

As another example, the visually-demarked regions 420 and 424 can have visual markers, e.g., stickers, that are identifiable by the image processing system 450. For example, the image processing system 450 can process each initial image to identify the visual markers, and then determine the portion of the initial images that depict the visually-demarked regions 420 and 424 using the identified visual markers in the initial images. As a particular example, a sticker can be placed on each corner of a rectangular visually-demarked region, and the system 450 can determine that each pixel bounded by the four identified stickers depicts the visually-demarked region.

As another example, the visually-demarked regions 420 and 424 can have a measured or predetermined location and/or orientation in the scene 400. As a particular example, the visually-demarked regions 420 and 424 can have tracking components 422 and 426, respectively, that can be used to track the locations of the visually-demarked regions 420 and 424. For example, each tracking component 420 and 424 can be in a predetermined location on the respective visually-demarked region. As another example, each tracking component 420 and 424 can be in a predetermined location along the periphery of the respective visually-demarked region. As another example, each tracking component 420 and 424 can be in another location on the surface 410, where the location has a predetermined or determined relationship with the location on the surface 410 of the respective visually-demarked regions.

In some implementations, the tracking components 422 and 426 can execute "local" tracking; i.e., the tracking components 422 and 426 can each determine the position of the respective visually-demarked region in a respective coordinate system, independently of each other and any other object in the scene 400.

Instead or in addition, the tracking components 422 and 426 can execute "global" tracking; i.e., the tracking components 422 and 4265 can be components of a central system that tracks the position of multiple different objects in the scene 400 in a common coordinate system. For example, the tracking components can interact with a tracking base station 460, which is a master tracking device that allows the location of every object in the scene 400 that has a tracking component to be determined. Using the tracking components 422 and 426, the location and orientation of the green-screen object 410 can be determined continuously in real-time.

Each tracking component 422 and 426 can have multiple photosensors or other tracking mechanisms (e.g., RFID) that are separated by a distance.

In some implementations, the tracking base station 460 emits a radiation signal, e.g., a wavelength of light. Each sensor in the tracking components 422 and 426 can reflect the radiation signal back to the tracking base station 460. The tracking base station 460 can use the multiple returned radiation signals to determine the location and orientation of the visually-demarked regions 420 and 424. For example, the tracking base station 460 can determine the 6 degrees of freedom of the object, e.g., the x-position, y-position, z-position, pitch, yaw, and roll of the object according to a common three-dimensional coordinate system. The tracking base station 460 can repeatedly perform this process in order to determine the location and orientation of the regions 420 and 424 continuously in real-time.

In some other implementations, the tracking base station 460 can emit a first radiation signal and a second radiation signal concurrently, e.g., if the tracking base station 460 includes two emitters that are physically separated by a distance. Each sensor in the tracking components 422 and 426 can detect the first radiation signal and the second radiation signal at respective detection times, and the tracking components 422 and 426 can use the respective detection times of each of the photosensors to determine the position and orientation of the respective regions 420 and 424 in real time.

In some other implementations, the tracking base station 460 can include multiple cameras capturing images of the scene 400. The tracking base station 460 can perform object recognition on the captured images, and determine the location and orientation of the respective regions 420 and 424 that are recognized in the captured images. For example, as described above, the regions 420 and 424 can be a predetermined color, and the tracking base station 460 can perform color detection to identify the regions 420 and 424 in the captured images. As another example, the regions 420 and 424 can be a predetermined shape, and the tracking base station 460 can process the captured images to perform edge detection, and determine which identified edges match the predetermined shape of the regions 420 and 424.

Whether the respective locations and orientations of each visually-demarked regions 420 and 424 are determined by the tracking base station 460 or by tracking components 422, 426 of the regions 420 and 424 themselves, the determined locations and orientations can be provided to the image processing system 450.

In some implementations, the first device 430 and the second device 440 can also have tracking components 436 and 446, respectively, that perform similar functions to the tracking components 422 and 426. The respective locations and orientations of the devices 430 and 440 can be determined and provided to the image processing system 450 as described above.

After receiving the respective locations and orientations of the devices 430 and 440 and the visually-demarked regions 420 and 424, the image processing system 450 can determine the respective portions of the initial images 431a-b and 441 that depict the visually-demarked regions 420 and 424. That is, the image processing system 450 can use the location and orientation of a device 430 or 440 at the time that the device 430 or 440 captured a respective initial image 431a-b or 441 to determine the portion of the initial image 431a-b or 441 that depicts the visually-demarked regions 420 and 424.

In particular, the image processing system 450 can use camera data defining properties of the respective device 430 or 440 that captured the initial image 431a-b or 441 to determine the portion of the initial image 431a-b or 441 that depicts the visually-demarked regions 420 and 424. For example, the camera data can define, for any location and orientation of the devices 430 and 440 in the scene 400, a field of view of the cameras of the devices 430 and 440, e.g., by defining one or more of a focal length, resolution, or aspect ratio of the camera. Thus the camera data of a device, e.g., the device 440, can define a one-to-one relationship between i) the tracked location and orientation of the device 440 and ii) the rendering of the visually-demarked regions 420 and 424 in an image captured by the device 440. As a particular example, the image processing system 450 can generate, using the camera data, three-dimensional models of the respective viewing frustums of the devices 430 and 440 in the common coordinate system of the physical scene 400. The image processing system 450 can also generate, using the determined 6DoF locations and orientations of the visually-demarked regions 420 and 424, three-dimensional models of the regions 420 and 424 in the common coordinate system of the physical scene 400. The image processing system can then project the regions 420 and 424 onto a viewing plane of the modeled frustums of the devices 430 and 440 in order to determine the renderings of the regions 420 and 424 in the images captured by the devices 430 and 440.

In some implementations, instead or in addition to tracking the location of the visually-demarked regions 420 and 424 using the tracking components 422 and 426, the image processing system 450 can determine the location visually-demarked regions 420 and 424 in the physical scene 400 using multiple images of the scene 400 taken by the same device 430 or 440 across multiple time points, e.g., using a motion parallax algorithm. That is, the image processing system 450 can detect the visually-demarked regions 420 and 424 in each image corresponding to respective time points, where the visually-demarked regions 420 and 424 are depicted from a slightly different angle at each time point. Then, the image processing system 450 can infer the respective locations of the visually-demarked regions 420 and 424 in the scene 400 according to a common three-dimensional coordinate system using a motion parallax algorithm.

In the implementations in which the image processing system 450 receives a stereoscopic initial image, the image processing system 450 can process the initial stereoscopic image to determine the respective locations of the visually-demarked regions 420 and 424 in the scene 400 from each eye point perspective. The image processing system 450 can use differences between the two images of the stereoscopic image, as well as the known distance between the respective cameras that captured the images, e.g., the distance between the first camera 434a and the second camera 434b, to geometrically determine the respective locations of the visually-demarked regions 420 and 424 in the physical scene 400.

After determining the respective portions of the initial images 431a-b and 441 that depict the visually-demarked regions 420 and 424, the image processing system 450 can process the initial images 431a-b and 441 to generate updated images 438a-b and 448, respectively. The updated images depict the same scene 400, with one or more virtual objects rendered within or proximate to the visually-demarked regions 420 and 424. The virtual objects can be rendered in such a way, particularly when viewed in stereo, to appear on the surface of the demarked region. Alternatively, the virtual objects can be rendered to appear above or below the surface of the demarked region, e.g., by a preset distance.

Each visually-demarked region can be used by the image processing system as a representation of a demarcation of a volume, e.g., including the volume perceived to be above and below the demarked region, that is bounded by the area of the demarked region. The volume represented by a visually-demarked region identifies locations in the scene 400 within which virtual objects can be rendered for display to the user on the displays 430 and 440. That is, the volume identifies locations in the scene 400 where virtual objects can be presented to the user as superimposed onto the physical view in that volume. The virtual volume can be above or below the demarked region. The demarked region can provide one surface of the virtual volume, or the demarked region can provide a cross-section through the surface of the virtual volume. The virtual volume may extend above or below (or in front of or behind) the demarked region. In some implementations, the virtual volume is an isometric virtual volume extending from the demarked region. In some other implementations, the virtual volume is not isometric.

For example, the image processing system 450 can maintain data that defines an algorithm that can be used to generate the virtual volume based on the determined position of each visually-demarked region. When generating composite images, the image processing system 450 can enforce the requirement that renderings of virtual objects be constrained to be within the virtual volumes. For example, the image processing system 450 can maintain data defining the boundaries of the volume in the common coordinate system of the scene 400, e.g., by maintaining data representing a fittable model of a virtual container object. For each visually demarked region, the image processing system 450 can fit the model to the visually demarked region. An instance of the model that has been fitted to the visually demarked region provides the virtual container object that represents the virtual volume. Fitting the model to the visually demarked region can include fitting a perimeter of the virtual container object to the perimeter of the visually demarked region, as well as a location and orientation of the virtual container object according to the location and orientation of the corresponding visually-demarked region.

As a particular example of fitting the model, the perimeter of the virtual container object can be selected by the image processing system 450 such that a perimeter of a projection of the virtual container onto the surface 410 matches the edges of the respective demarked region 420 or 424. In some implementations, the projection is an orthogonal projection, e.g., the volume can extend orthogonally upward and/or downward from the surface 410 (in the example depicted in FIG. 4A, the volume would be a rectangular parallelepiped).

Alternatively, the image processing system 450 may receive an input from a sensor or the user that sets the Z-axis. For example, the user may input an x-y axis. As another example, an accelerometer can be used to detect the gravitational direction, and gravity can be used as the z-axis. In the case of a planar or near-planar surface (e.g., a slightly convex or concave surface), the image processing system 450 can determine the orientation of the plane of the surface from the captured images, and then treat that plane as the x-y plane, and the direction normal to surface as the z-axis.

In some implementations, the projection is not an orthogonal projection; for example, the volume might be a truncated pyramid (i.e., the volume slopes inward toward the center of the visually-demarked region as it rises along a z-axis of the common coordinate system, where the z-axis is orthogonal to the surface 410) or an inverted truncated pyramid (i.e., the volume slopes outward away from the center of the region as it rises along the z-axis).

In some implementations, the virtual container object is "unbounded" along the z-axis of the common coordinate system, where the z-axis is orthogonal to the surface 410. For example, the virtual container can extend along the z-axis to a surface of a chamber containing the environment or to the limits of the coordinate system. In some other implementations, the image processing system 450 maintains data defining a height of the virtual container object, e.g., a fixed height or a height defined with respect to the respective visually-demarked region, e.g., a certain percentage of the length of one of the sides of the respective region.

FIG. 4B shows the updated images 438a-b and 448 displayed on the devices 430 and 440, respectively. As depicted in FIG. 4B, the image processing system 450 has rendered a sailboat virtual object on top of the first visually-demarked region 420 and a user interface virtual object within the second visually-demarked region 424. In particular, the image processing system 450 has rendered a dual projection (i.e., one projection per eyepoint of the user) of each virtual object rendered to appear within and/or proximate to the respective demarked surface.

To generate the updated images 438a-b and 448, the image processing system 450 can maintain data characterizing a model of each virtual object—in this example, the sailboat virtual object and the user interface virtual object. Each model identifies a shape and size of the respective virtual object within the virtual object model space. Each model can also have associated data that identifies a location and orientation of the respective virtual object in common three-dimensional coordinate system of the scene 400. For example, the associated data can define the location and orientation of the virtual object in six dimensions: three dimensions defining the location of the virtual object (e.g., x, y, and z) and three dimensions defining the orientation of the object (e.g., pitch, yaw, and roll).

As a particular example, the image processing system 450 can maintain data characterizing a location and orientation of a virtual object in a virtual coordinate system that is different from the common coordinate system of the physical scene 400. The image processing system 450 can also maintain a mapping from the virtual coordinate system to the common coordinate system of the scene 400; that is, each point in the virtual coordinate system can have a corresponding point in the common coordinate system of the scene 400. For example, the virtual coordinate system can be defined in relation to one of the visually-demarked regions 420 or 424, e.g., the origin of the virtual coordinate system can be defined by the visually-demarked region 420 or 424. Therefore, if the visually-demarked region 420 or 424 is moved (e.g., if a user moves the visually-demarked region 420 or 424 to a different location on the surface 410), the implied location and orientation of the virtual object in the common coordinate system of the scene 400 can be updated accordingly.

The image processing system 450 can also maintain a three-dimensional model of the scene 400. The model can include the coordinates, in the common three-dimensional coordinate system of the scene 400, of the visually-demarked regions 420 and 424 as well as a location and orientation of each of the devices 430 and 440. For example, when the image processing system 450 receives data from the tracking base station 460 identifying the location and orientation of a region 420 or 424 or a device 430 or 440, the image processing system 450 can update the maintained model of the scene 400 to reflect the new location and orientation.

Using the models of the virtual objects and the model of the scene 400, the image processing system 450 processes each initial image to render the sailboat virtual object and the user interface virtual object within or proximate to the visually-demarked regions 420 and 424 from a perspective corresponding to the perspective of the respective device that captured the initial image.

FIG. 4C shows the same physical scene 400 depicted in FIGS. 4A and 4B, with a stereoscopic display device 470. The stereoscopic display device 470 includes two transparent, or partially transparent, lenses 472a-b through which the user can view the scene 400. That is, the stereoscopic display device 470 is a pair of "augmented reality glasses" through which the user can directly view the scene 400 (instead of viewing an image of the scene 400 captured by a camera as part of the display device 470). Therefore, typically the stereoscopic display device 470 does not have a camera.

In this example, the image processing system 450 generates images 452a-b for respective lenses 472a-b of the sailboat virtual object that are to be projected onto the lenses 452a-b or rendered within the lenses, 452a-b so that the sailboat virtual object appears to the user to be within or proximate to the visually-delimited region 420 of the surface 410 in the physical scene 400. For example, the stereoscopic display device 470 can use a laser projector or some other light-based projection system to project the images 452a-b onto the lenses 472a-b. Similarly, the image processing system 450 can generate images of the user interface virtual object to be projected onto the lenses 472a-b so that the user interface virtual object appears to the user to be within or proximate to the visually-delimited region 422.

In order to generate the images 452a-b of the sailboat virtual object, the image processing system 450 can maintain data representing the location and orientation of the stereoscopic display device 470 within the common coordinate system of the physical scene 400. As described above, the image processing system can use a tracking component 476 of the stereoscopic display device 470 and/or a tracking base station 460 to maintain the data representing the location and orientation of the stereoscopic display device 470.

As described above, the image processing system 450 can also maintain a three-dimensional model of the sailboat virtual object, as well as data representing a location and orientation of the sailboat virtual object in the common coordinate system of the physical scene 400. For example, the image processing system 450 can maintain data representing a location and orientation of the sailboat virtual object in a virtual coordinate system, as well as a mapping from the virtual coordinate system to the common coordinate system of the physical scene 400, e.g., a mapping based on the location of the visually-demarked region 420.

Using the determined location and orientation of the stereoscopic display device 470, the image processing system can determine the perspective of each lens 472a-b, i.e., the perspective from which each lens 462a-b is viewing the physical scene 400. Then, using the location and orientation of the sailboat virtual object in the common coordinate system of the physical scene 400, the image processing system 450 can determine the projection of the sailboat virtual object onto the viewpoint of each lens 472a-b.

The image processing system 450 can then communicate the data representing the rendered images 452a-b to the stereoscopic display device 470, which can then project the images 452a-b onto the lenses 472a-b for display to the user.

Figure 5A:
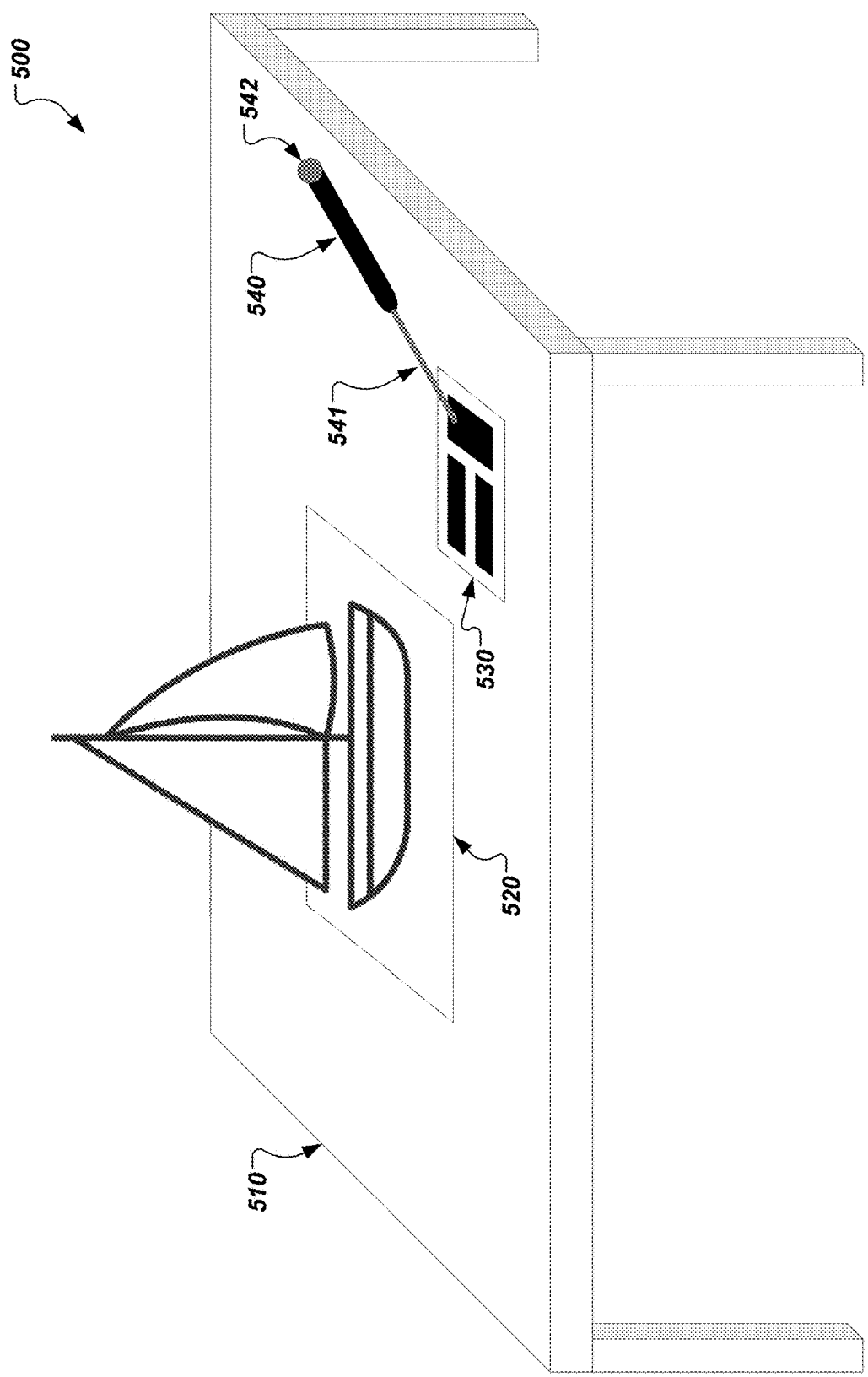
FIGS. 5A and 5B present an example system with a pointing device.
Figure 5B:
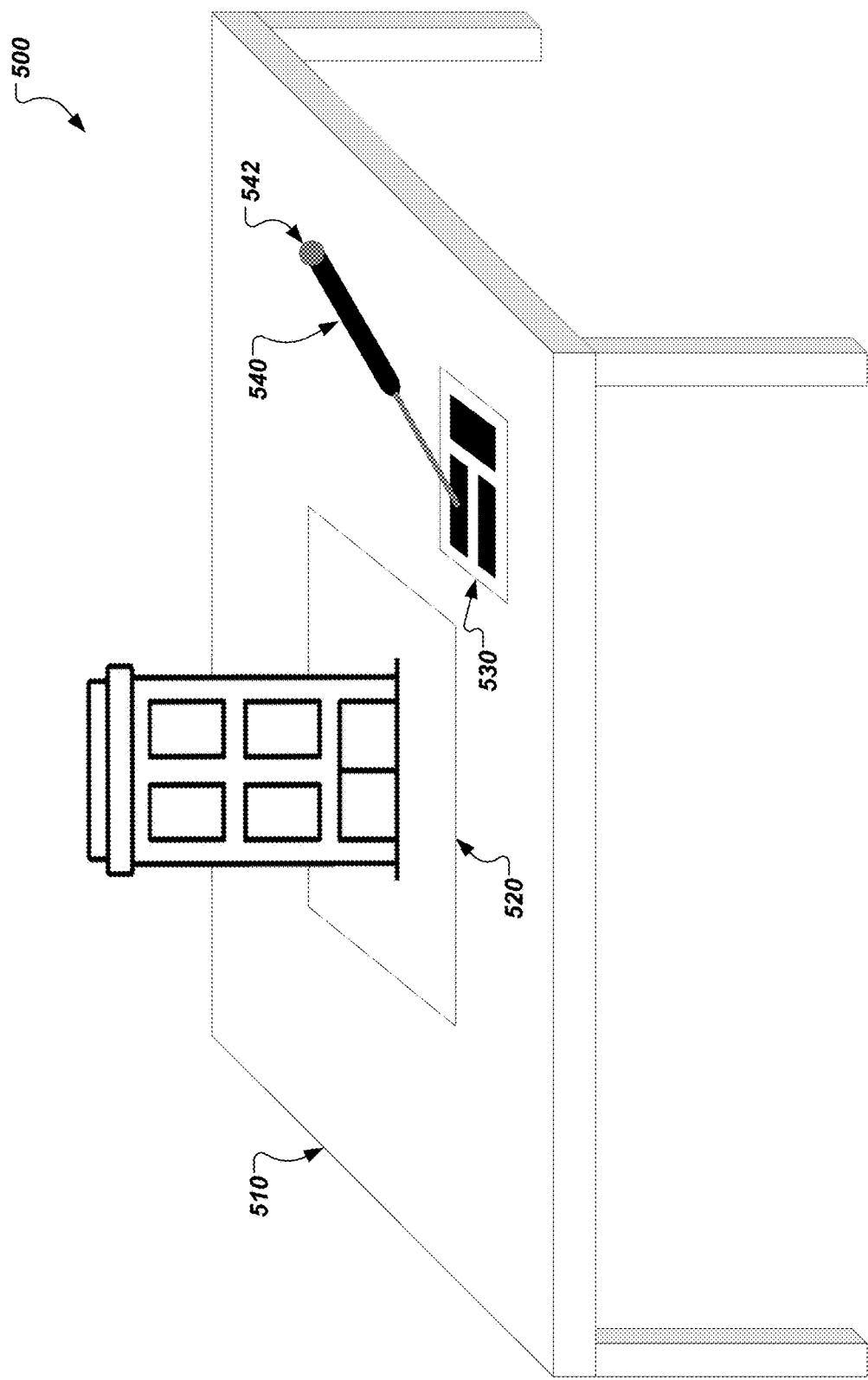

FIGS. 5A and 5B show an example updated image of a physical scene 500. The updated image has been generated by a system, e.g., the image processing system 450 depicted in FIGS. 4A and 4B. The system has processed an initial image of the physical scene 500 to generate the updated image that includes a rendering of virtual objects in the physical scene 500. In this example, the virtual objects include a sailboat virtual object and a separate distinct user interface virtual object.

The scene 500 includes a physical surface 510 and a physical pointer 540. The surface 510 includes visually-demarked regions 520 and 530.

In some implementations, the pointer 540 is "passive," i.e., the position of the pointer 540 is tracked by an external system. For example, one or more cameras in the scene can capture images of the scene 500 and process the images to determine the location and orientation of the pointer 540 in the scene 500, as described above. For example, the pointer can be a stylus, a thimble, or the user's finger.

In some other implementations, the pointer 540 can be a pointing device; i.e., a pointer that is equipped with one or more active tracking components 542, e.g., RF transceivers or IR sources, that aid with tracking the pointing device. For example, the pointing device can be a stylus with a tracking component, or a stylus with an attached camera. In some such implementations, the scene 500 includes a master tracking device, e.g., the tracking base station 460 depicted in FIGS. 4A and 4B, that facilitates tracking the pointing device.

As depicted in FIG. 5A, the pointer 540 is a physical pointing device. In some implementations, the physical pointing device 540 has a virtual "tip" 541 that is rendered as extending from the pointer 540. That is, the system can determine the location and orientation of the pointer 540 in the scene 500, and render, in the updated image of the scene 500, a tip extending from the end of the pointer 540 in the direction of the orientation of the pointer 540.

The pointing device 540 can be used by a user to interact with the virtual objects, the visually-demarked regions 520 and 530, or both.

In some implementations, one or more of the visually-demarked regions 520 and 530 are touch-enabled and can recognize touch at any location within the regions 520 and 530, as described above.

In some other implementations, the system can use the locations and orientations, in a common three-dimensional coordinate system of the scene 500, of i) the pointer 540, ii) the visually-demarked regions 520 and 530, and iii) the virtual objects, to determine with which visually-demarked regions 520 and 530 or virtual object the pointer 540 is interacting. For example, as described above, the system can maintain data characterizing the respective location and orientation of the visually-demarked regions 520 and 530 and the virtual objects depicted within or proximate to the visually-demarked regions 520 and 530.

For example, the system can determine that the pointer 540 is interacting with an object, e.g., a visually-demarked regions 520 or 530 or a virtual object, if i) the pointer 540 is within a threshold distance of the object and ii) the pointer 540 oriented toward, i.e., pointing at, the virtual object. That is, the system can determine a point on a visually-demarked region 520 or 530 or a virtual object at which the pointer 540 is pointing. For example, the system can project a virtual or imaginary ray from the end of pointer 540 in the direction of the orientation of the pointer 540, until the ray intersects an object, which may be one of the visually-demarked regions 520 and 530 or a virtual object projected into the physical scene 500.

The system can generate an update to the image of the scene 500 in response to the interaction of the pointer 540.

Referring to FIG. 5B, the user manipulates the pointer 540 in order to interact with the user interface virtual object rendered within the second visually-demarked region 530. The interaction causes the virtual object rendered on top of the first visually-demarked region 520 to change from the sailboat virtual object to a building virtual object.

The user interface virtual object is a virtual objet that includes one or more elements with which the user can interact in order to provide user inputs. For example, the user interface virtual object can include renderings of one or more buttons, sliders, and/or other graphical interface elements with which the user can interact, e.g., either as a rendered flat objects on the surface within the designated demarked region or rendered as three-dimensional objects in stereo to appear to the user to extend above and/or below the demarked region surface.

As depicted in FIGS. 5A and 5B, the user interacts with a virtual object rendered according to one visually-demarked region (in this example, a user interface virtual object rendered within the second visually-demarked region 530) in order to update a virtual object that is rendered according to a second visually-demarked region (in this example, a virtual object rendered on top of the first visually-demarked region 520). However, in general the user can interact with any visually-demarked region to update any other visually-demarked region, e.g., the same visually demarked region.

Figure 6A:
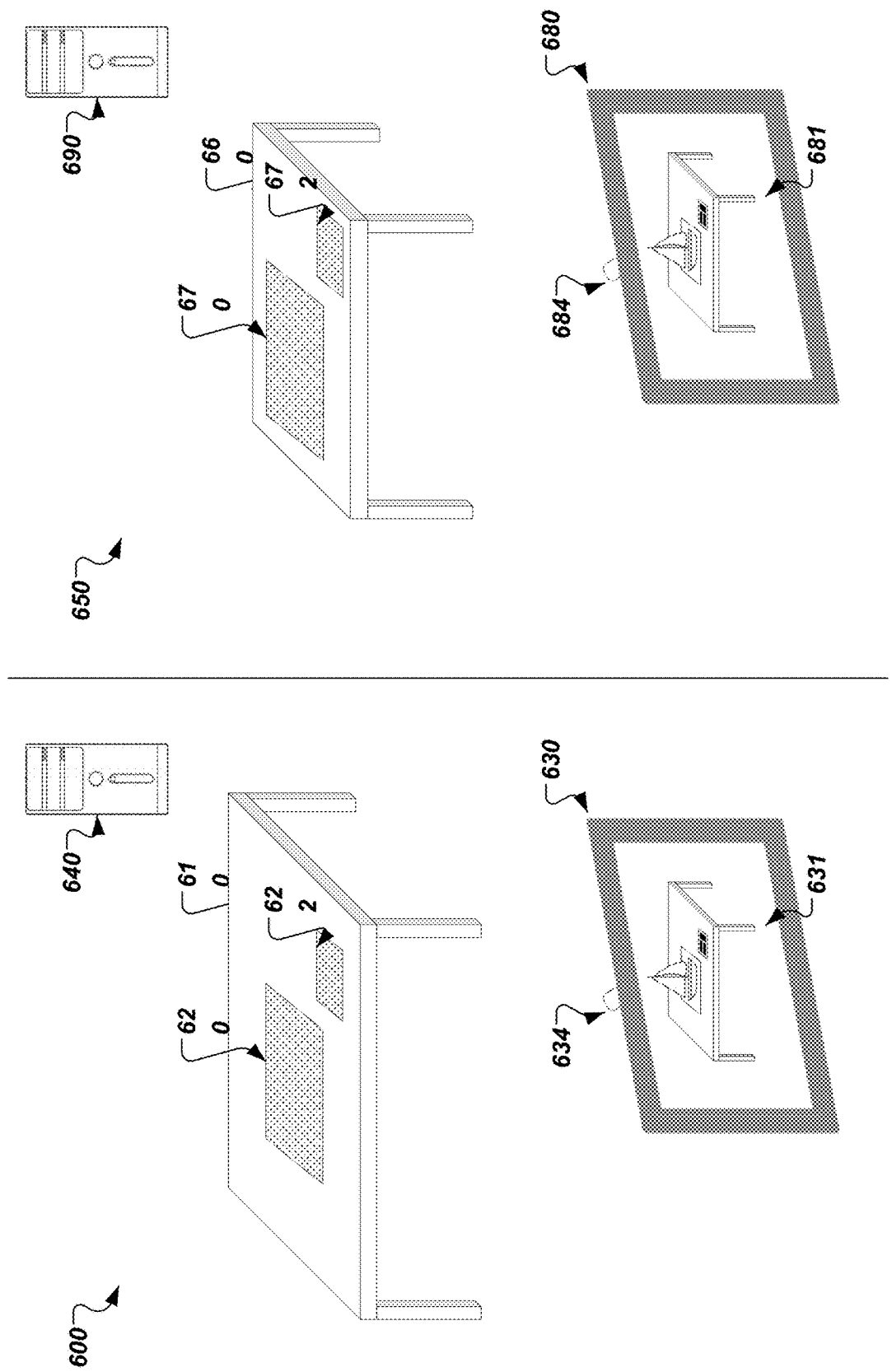
FIGS. 6A and 6B present respective pairs of example systems that are communicatively connected.
Figure 6B:
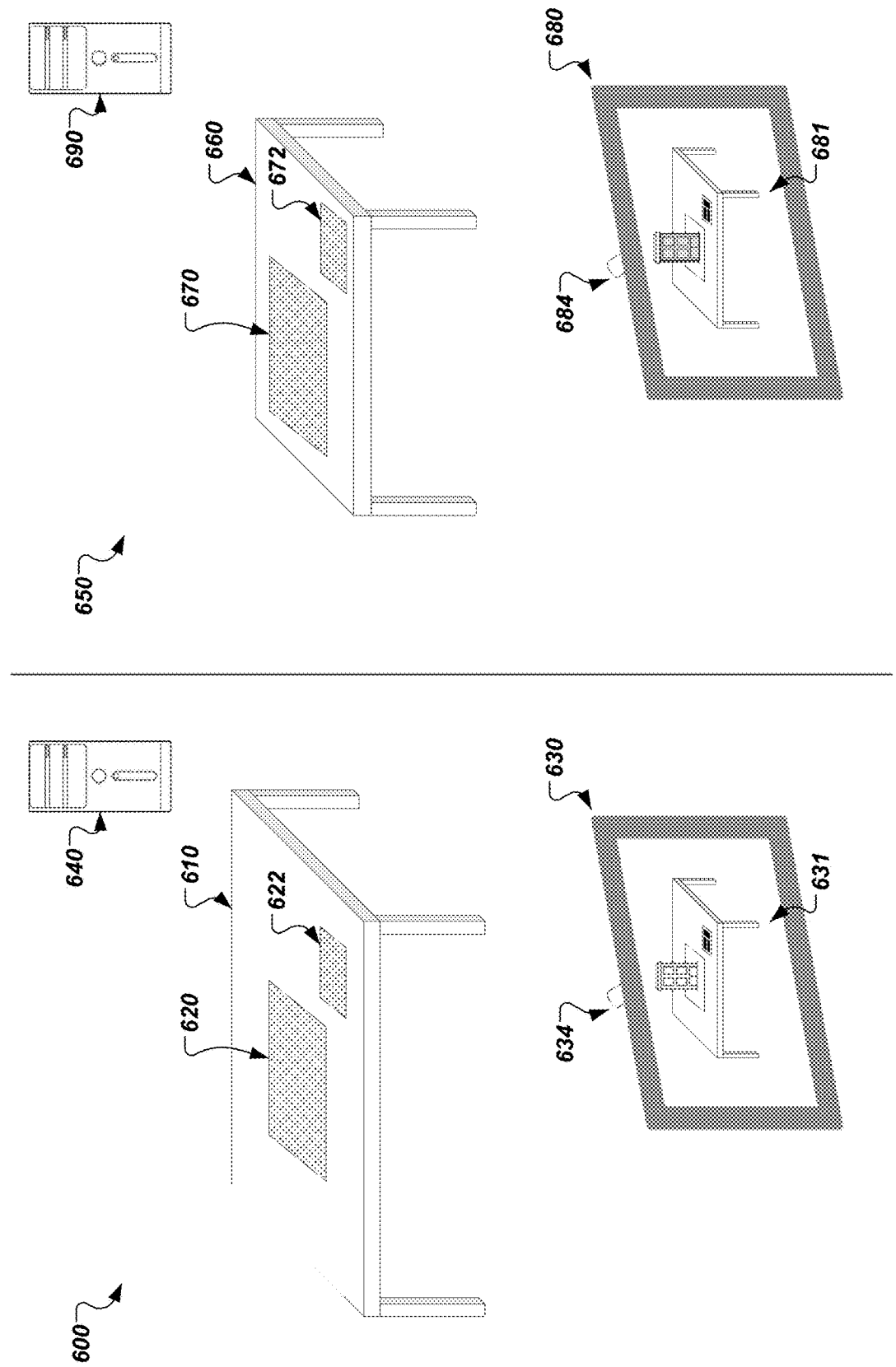

FIGS. 6A and 6B present respective pairs of example systems that are communicatively connected. As depicted in FIG. 6A, users viewing different scenes corresponding to the pair of example systems can view the same virtual objects rendered within the different scenes, even though the scenes are geographically separated from each other. As depicted in FIG. 6B, users viewing different scenes corresponding to the pair of examples systems can view different virtual objects rendered within the different scenes, e.g., virtual objects that are similar but have small differences.

FIG. 6A shows two different scenes 600 and 650, images 631 and 681 of which are rendered by respective systems 640 and 690 that are communicatively connected.

Each scene 600 and 650 includes a surface with one or more visually-demarked regions. In particular, the first scene 600 includes a surface 610 with visually-demarked regions 620 and 622, and the second scene 650 includes a surface 660 with visually-demarked regions 670 and 672.

The scenes 600 and 650 can be physically separated by any distance. For example, the scenes 600 and 650 can be in different rooms in the same building. As another example, the scenes 600 and 650 can be in different buildings in respective different cities or countries.

Initial images of the scenes 600 and 650 can be captured by devices 630 and 680, respectively, e.g., using cameras 634 and 684 that are components of the devices 630 and 680, respectively.

An initial image captured by the device 630 can be provided to the system 640 to generate an updated image 631 of the scene 600 that include renderings of virtual objects within or proximate to the visually-demarked regions 620 and 622. Similarly, an initial image captured by the device 680 can be provided to the system 690 to generate an updated image 681 of the scene 650 that include renderings of virtual objects within or proximate to the visually-demarked regions 670 and 672.

In particular, the renderings of virtual objects in the image 631 of the scene 600 and the image 681 of the scene 650 are renderings of the same virtual objects. In particular, the same virtual object (in this example, a sailboat virtual object) is rendered by the system 640 to be on top of the visually-demarked region 620 in the scene 600 and by the system 690 to be on top of the visually-demarked region 670 in the scene 650. Similarly, the same virtual object (in this example, a user interface virtual object) is rendered by the system 640 to be on top of the visually-demarked region 622 in the scene 600 and by the system 690 to be on top of the visually-demarked region 672 in the scene 650.

To generate the respective updated images 631 and 681, the systems 640 and 690 can be communicatively connected. For example, the systems 640 and 690 can maintain a single model of each virtual object that each system 640 and 690 accesses to generate the updated images. As a particular example, one of the systems 640 or 690 can maintain the virtual models and sends data characterizing the models to the other system.

As described above, data representing the respective locations and orientations of the visually-demarked regions 620, 622, 670, and 672 can be maintained by the corresponding systems 640 and 690. Thus, if the location or orientation of one of the visually-demarked regions moves (e.g., if a user in the scene 600 moves the visually-demarked region 620), then the corresponding system (in this example, the system 640), can update maintained data characterizing the locations and orientations of the visually-demarked regions in the corresponding scene 600.

As described above, a user can use a pointer to interact with the visually-demarked regions and/or the virtual objects rendered according to the visually-demarked regions. In particular, a user in either scene, e.g., the scene 600, can interact with a visually-demarked region or virtual object in the scene 600 and cause a change to the updated images of both scenes 600 and 650 generated by both systems 640 and 690. For example, the change can include one or more of: adding a rendering of a new virtual object to the updated images, changing the rendering of an existing virtual object in the updated images, or removing a rendering of an existing virtual object from the updated images. Because the systems 640 and 690 generate the updated images according to the same models of the virtual objects, a user input in one scene is reflected in the other scene. To continue the example of FIG. 5B, if a user in the scene 600 manipulates a pointer to change the virtual object rendered on the visually-demarked region 620 from the sailboat virtual object to the building virtual object, then the system 690 also generates an updated image 681 of the scene 650 in which the building virtual object is rendered on top of the visually-demarked region 670.

Although the users in respective scenes 600 and 650 are viewing the same virtual objects, the users can view the virtual objects from different perspectives, e.g., if the users are viewing the respective surfaces 610 and 660 from different positions within the scenes 600 and 650. As a particular example, a user on the far side of the surface 610 (from the perspective of FIG. 6A) can view a different side of the sailboat virtual object than a user on the near side of the surface 650 (from the perspective of FIG. 6A).

In this way, different users in the different scenes 600 and 650 can interact with each other and with the same virtual objects, even though the users are not geographically together. Furthermore, the users in different scenes 600 and 650 do not at the same see the same perspective of the virtual object, but rather each user's perspective to the tracked visually-demarked regions determine the projection of the virtual object (e.g., the sailboat) as rendered and seen by each respective user.

In some implementations, the systems 640 and 690 are the same system. For example, a single system in one of the scenes 600 or 650 can be communicatively connected to both devices 630 and 680 and generate updated images 631 and 681 for both devices 630 and 680.

FIG. 6B shows the same two different scenes 600 and 650 as FIG. 6A, where the images 631 and 681 of the respective scenes 600 and 650 are rendered by the respective systems 640 and 690, as described above.

The users in respective scenes 600 and 650 can view different virtual objects within the respective visually-demarked regions 620, 622, 670, and 672. In particular, as depicted in FIG. 6B, the users in the first scene 600 can view a first "building" virtual object in the region 620 and the users in the second scene 650 can view a second "building object" in the region 670. For example, the first building object can represent a building before construction on the building has begun, and the second building object can represent the building after the construction has been completed.

In some implementations, the systems 640 and 690 can maintain shared data that represents each of the different virtual objects that can be viewed by users in respective scenes 600 and 650. In the example depicted in FIG. 6B, the systems 640 and 690 can maintain a first three-dimensional model representing the first building virtual object, and a second three-dimensional model representing the second building virtual object.

In some other implementations, the systems 640 and 690 can maintain a single three-dimensional model corresponding to the different virtual objects (in this example, a single model representing both building virtual objects). Then, the system can process the data representing the model in order to update the model to generate different versions of the virtual object corresponding to respective scenes. In the example depicted in FIG. 6B, the systems 640 and 690 can maintain a single model representing both building virtual objects. The systems 640 and 690 can then update the model to generate the first building virtual object rendered in the first scene 600, and/or update the model to generate the second building virtual object rendered in the second scene 650.

In some other implementations, the systems 640 and 690 can maintain a single three-dimensional model corresponding to the different virtual objects depicted in respective scenes 600 and 650 (in this example, a single model representing both building virtual objects) and one or more secondary models representing respective "overlays" over the single three-dimensional model. The systems 640 and 690 can then render, to respective users in respective scenes 600 and 650, the same single three-dimensional model with one or more overlays rendered on top of the single three-dimensional model, e.g., where one overlay is rendered on one display 630 from that display's perspective and a different second overlay is rendered on the other display 630 from that display's perspective. For example, each overlay might represent respective options for renovations that can be done to the building represented by the building virtual objects. As a particular example, one overlay may be a paint scheme overlay and another overlay may be a scaffolding layout overlay, but the underlying rendered view of the building virtual model is presented equally on both displays (while still corrected by the perspective as determined by the spatial positioning of each display 630 and 680).

For example, a user in a scene 600 or 650 can use a pointer to interact with the visually-demarked regions and/or the virtual objects in order to update the respective virtual object rendered in the scene 600 or 650. In particular, a user in a scene, e.g., the scene 600, can interact with a visually-demarked region or virtual object in the scene 600 and cause a change to the updated images of the scene 600 generated by the system 640, while not causing a change to the updated images of the scene 650 generated by the system 690.

To render the respective updated images 631 and 681, the systems 640 and 690 can maintain data identifying, for each scene 600 and 650, a respective virtual object that is to be rendered in each visually-demarked region (and, optionally, modifications to the data representing the respective virtual objects).

In this way, different users in the different scenes 600 and 650 can interact with each other on a shared project, while viewing different virtual objects or differently modified versions of the same virtual object. That is, if the different users wish to view respective different modifications, they can do so simultaneously.

As another example, the users in respective scenes 600 and 650 can apply different modifications to the data representing the virtual objects rendered within the scenes in the respective visually-demarked regions 620, 622, 670, and 672. For example, the users can use pointers to interact with the user interface virtual objects rendered within the regions 622 and 672. As a particular example, the users in the respective scenes 600 and 650 can view different respective portions of the same virtual object, e.g., a user in the first scene 600 can view the entire sailboat virtual object depicted in FIG. 6A while a user in the second scene 650 can zoom in on a particular portion of the sailboat virtual object, e.g., the hull. As another particular example, a user in a scene 600 or 650 can change the orientation of a virtual object, e.g., by flipping the sailboat virtual object upside down to see the bottom of the hull. As another particular example, a user in a scene 600 or 650 can submit a user input to the respective system 640 or 690 to process the data representing a virtual object in a particular way, e.g., changing the color, transparency, etc., of the virtual object.

As a particular example, the users in each scene 600 and 650 can view differently-modified versions of a virtual map of a city in the visually-demarked regions 620 and 670, respectively. For example, the users in the first scene 600 can view the virtual map of the city with current car traffic rendered on the streets of the city, while the users in the second scene 650 can view the virtual map of the city with current airplane traffic rendered in the air above the city. As another example, the users in the first scene 600 can view the virtual map of the city as it would appear in the summer, while the users in the second scene 650 can view the virtual map of the city as it would appear in the winter.

In some implementations, different users in the same scene (e.g., the first scene 600) can view different virtual object within the same visually-demarked regions (e.g., regions 620 and 622). In these implementations, a single system 640 can maintain data identifying, for each user, the particular virtual objects (and, optionally, the modifications to the data representing the particular virtual objects) currently being viewed by the user. That is, the users do not have to be geographically separated (e.g., in respective scenes 600 and 650) in order to view different virtual objects.

Example Processes

Figure 7:
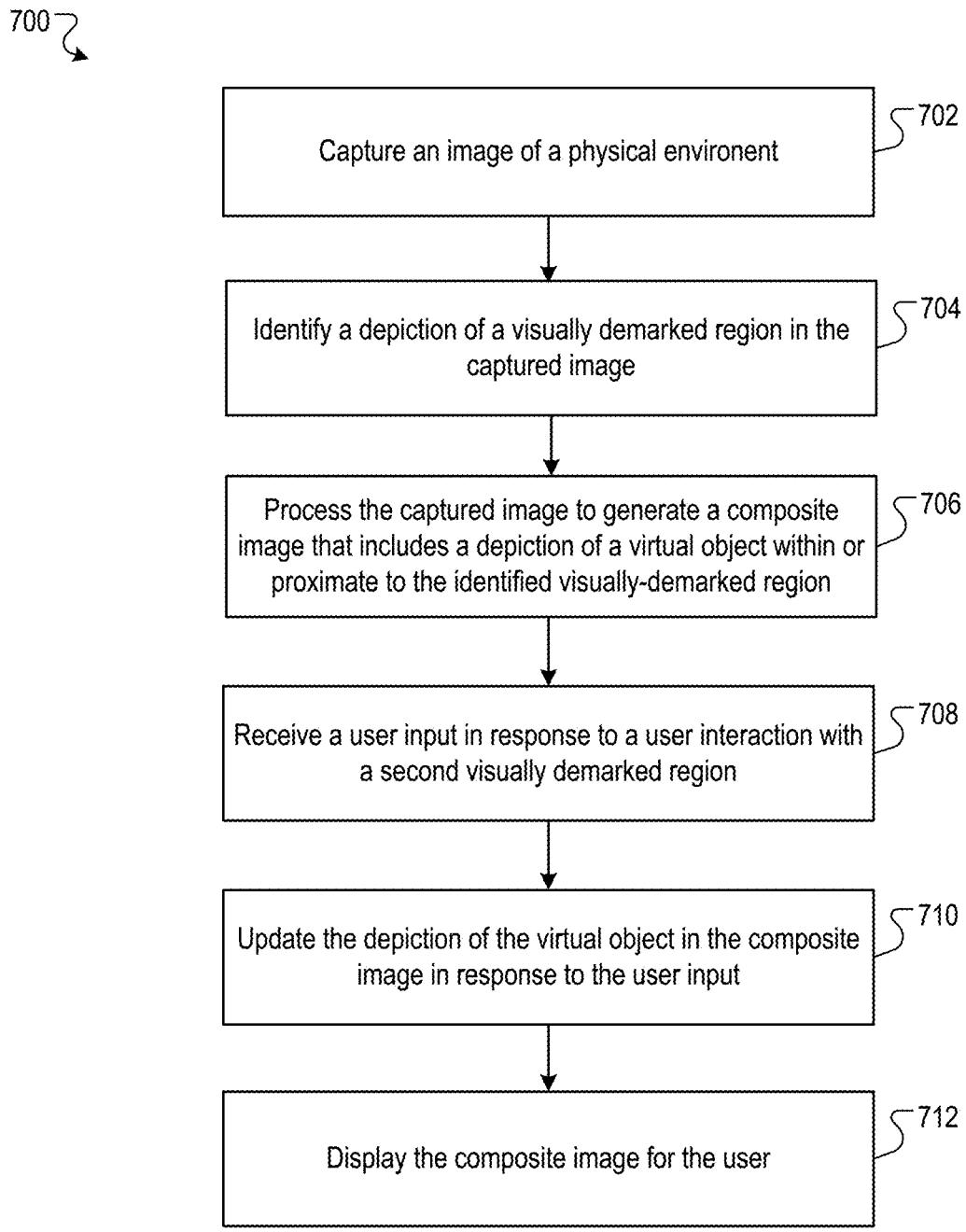
FIG. 7 is a flow diagram of an example process for generating a composite image.

FIG. 7 is a flow diagram of an example process 700 for generating composite images. For convenience, the process 700 will be described as being performed by a system of one or more computers located in one or more locations. For example, an image processing system, e.g., the image processing system 450 depicted in FIG. 4A, appropriately programmed in accordance with this specification, can perform the process 700.

The system captures an image of a physical environment (step 702). The system can capture the image using a capture device in the physical environment. The physical environment can include a surface that includes a physically visually-demarked region.

The system identifies a rendering of the physically visually-demarked region in the captured image (step 704). For example, the visually-demarked region can be visually contrasted from another region of the surface (e.g., by different colors), elevated above another region of the surface, or delineated within the surface by a physically visible outline. As a particular example, the visually-demarked region can be a secondary surface placed on top of the surface, e.g., a piece of paper, cardboard, or canvas placed on top of the surface.

In some implementations, the system can process the image using a machine learning model that has been configured through training to identify visually-demarked regions of surfaces.

Instead or in addition, the system can obtain data that characterizes i) a location and orientation of the captured device within the physical environment and ii) a location and orientation of the visually-demarked region within the physical environment. As a particular example, the system can obtain the data from a tracking base station or one or more tracking components. The system can then process the data to identify the rendering of the visually-demarked region in the image.

The system processes the captured image to generate a composite image that includes a rendering of a virtual object within or proximate to the identified visually-demarked region (step 706).

The system receives a user input in response to a user interaction with a second visually-demarked region (step 708). The second visually-demarked region can be the same visually-demarked region, or a different visually-demarked region on the same surface or a different surface. For example, the second visually-demarked region can include a rendering of a user interface virtual object.

In some implementations, the user input is received from a spatially-tracked physical pointing device. As a particular example, the system can render a virtual component, e.g., a "tip", of the physical pointing device that extends from the physical pointing device.

The system updates the rendering of the virtual object in the composite image in response to the user input (step 710).

The system displays the composite image for the user (step 712). For example, the system can display the composite image on a stereoscopic device.

Figure 8:
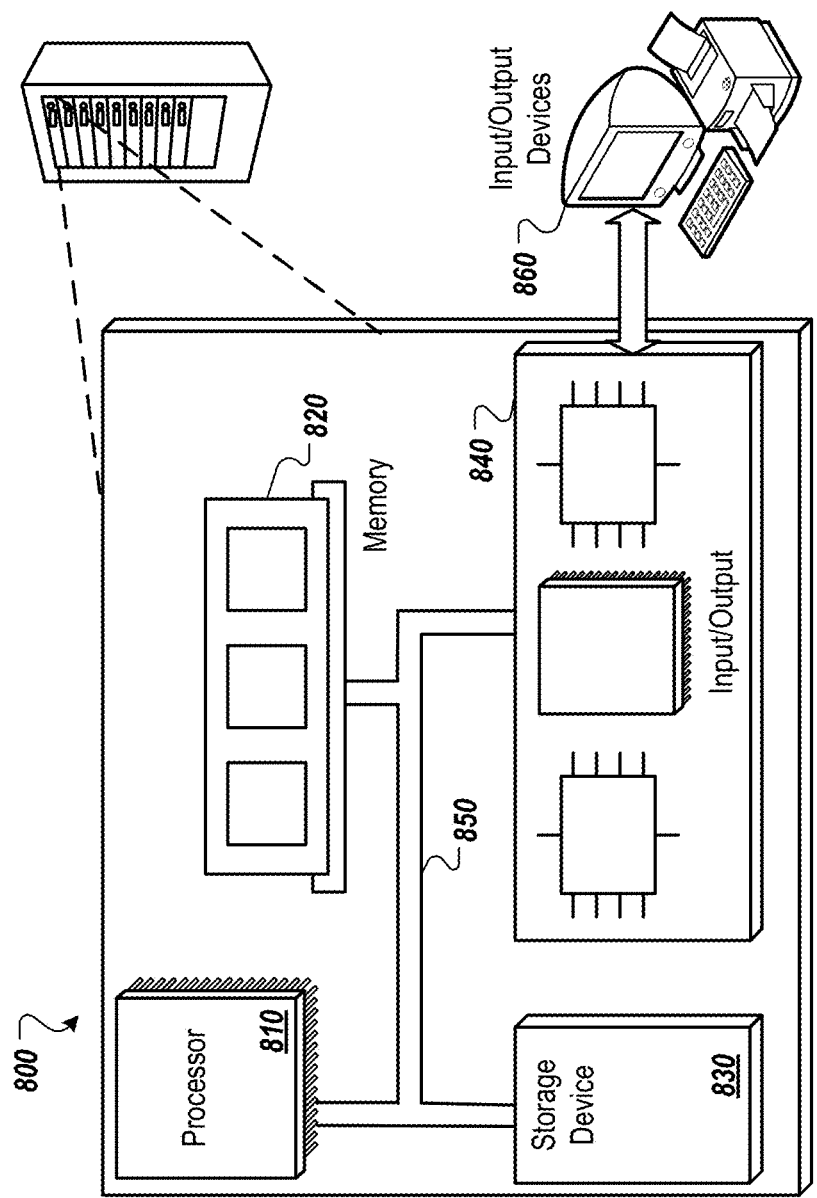
FIG. 8 is a block diagram of an example computer system.

FIG. 8 is a block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (for example, a cloud storage device), or some other large capacity storage device.

The input/output device 840 provides input/output operations for the system 800. In one implementation, the input/output device 840 can include one or more network interface devices, for example, an Ethernet card, a serial communication device, for example, a RS-232 port, and/or a wireless interface device, for example, a 802.11 card. In another implementation, the input/output device can include driver devices configured to receive input data and send output data to other input/output devices, for example, keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

It should be noted that the above-described embodiments are only examples, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
a capture device to capture an image of a physical environment; and
one or more storage devices storing instructions that are operable, when executed by one or more processors of the system, to cause the one or more processors to:
obtain an image of the physical environment as captured by the capture device,
identify a visually-demarked region on a surface in the physical environment as depicted in the image,
process the image to generate a composite image of the physical environment that includes a depiction of a virtual object, wherein a location of the depiction of the virtual object in the composite image is based on a location of the depiction of the visually-demarked region in the image, such that the virtual object is depicted to be within a volume defined according to the visually-demarked region, and
cause the composite image to be displayed for a user.

Embodiment 2 is the system of embodiment 1, wherein the instructions are further to obtain data representing a virtual container object that represents the volume defined according to the visually-demarked region, and to generate the composite image using the obtained data.

Embodiment 3 is the system of embodiment 2, wherein the obtained data comprises data identifying a location and orientation of the virtual container object in the physical environment, wherein the location and orientation of the virtual container object depends on a location and orientation of the visually-demarked region in the physical environment.

Embodiment 4 is the system of embodiment 3, wherein a perimeter of a projection of the virtual container object onto the surface in the physical environment matches a perimeter of the visually-demarked region.

Embodiment 5 is the system of any one of embodiments 1-4, wherein:
the instructions to obtain an image comprise instructions to obtain a stereoscopic image; and
the instructions to cause the composite image to be displayed include instructions to cause the composite image to be displayed on a stereoscopic display device.

Embodiment 6 is the system of any one of embodiments 1-5, wherein the visually-demarked region is a first visually-demarked region, and the instructions are further to cause the one or more processors to:
identify a user input that characterizes an interaction of the user with a second visually-demarked region; and
update, in response to the user input, the depiction of the virtual object in the composite image.

Embodiment 7 is the system of embodiment 6, wherein the second visually-demarked region includes a depiction of a second virtual object that is a user interface virtual object.

Embodiment 8 is the system of any one of embodiments 6 or 7, wherein the user input is received from a spatially-tracked physical pointing device.

Embodiment 9 is the system of embodiment 8, wherein the virtual object is a first virtual object, and wherein the instructions are further to render a second virtual object that is a virtual component of the physical pointing device, wherein the virtual component extends from the physical pointing device.

Embodiment 10 is the system of any one of embodiments 6-9, wherein the second visually-demarked region and the first visually-demarked region are the same.

Embodiment 11 is the system of any one of embodiments 1-10, wherein the physically visually-demarked region is visually contrasted from another region of the surface, elevated above another region of the surface, or delineated within the surface by a physically visible outline.

Embodiment 12 is the system of any one of embodiments 1-11, wherein the instructions to identify the depiction of the visually-demarked region in the image include instructions to process the image based on a machine learning model.

Embodiment 13 is the system of any one of embodiments 1-12, wherein the surface is a table and the visually-demarked region is a physically distinct surface portion of the table.

Embodiment 14 is the system of any one of embodiments 1-13, wherein the instructions to identify the depiction of a visually-demarked region in the image include instructions to:
identify first data that characterizes a location and orientation of the capture device within the physical environment;
identify second data that characterizes a location and orientation of the visually-demarked region within the physical environment; and
identify, based on the first data and the second data, the depiction of the visually-demarked region in the image.

Embodiment 15 is the system of embodiment 14, wherein the second data is received from one or more sensors proximate to the visually-demarked region.

Embodiment 16 is the system of any one of embodiments 1-15, wherein the instructions are further to:
identify a second user input related to interaction of a second user with a second visually-demarked region in a second physical environment that is separate from the first physical environment; and
update, in response to the second user input, the depiction of the virtual object in the composite image of the physical environment.

Embodiment 17 is a system comprising:
a display device that includes a transparent screen through which a user can view a physical environment; and
one or more storage devices storing instructions that are operable, when executed by one or more processors of the system, to cause the one or more processors to:
identify a location and orientation of the display device within the physical environment,
identify a location and orientation of a visually-demarked region on a surface in the physical environment,
process data representing a model of a virtual object to generate a rendering of the virtual object, and
provide the rendering of the virtual object to the display device for displaying the virtual object on the transparent screen such that the virtual object is superimposed in a view of the physical environment of the user to be within or proximate to the visually-demarked region, wherein a spatial location and orientation of the superimposed rendering of the virtual object in the physical environment as displayed to the user is based on the location and orientation of the visually-demarked region in the physical environment.

Embodiment 18 is the system of embodiment 17, wherein the instructions are further to obtain data representing a virtual container object that represents the volume defined according to the visually-demarked region, and to generate the composite image using the obtained data.

Embodiment 19 is the system of embodiment 18, wherein the obtained data comprises data identifying a location and orientation of the virtual container object in the physical environment, wherein the location and orientation of the virtual container object depends on a location and orientation of the visually-demarked region in the physical environment.

Embodiment 20 is the system of embodiment 19, wherein a perimeter of a projection of the virtual container object onto the surface in the physical environment matches a perimeter of the visually-demarked region.

Embodiment 21 is the system of any one of embodiments 17-20, wherein the visually-demarked region is a first visually-demarked region, and the instructions are further to cause the one or more processors to:

identify a user input that characterizes an interaction of the user with a second visually-demarked region; and update, in response to the user input, the rendering of the virtual object.

Embodiment 22 is the system of embodiment 21, wherein the instructions are further to:

generate a rendering of includes a rendering of a second virtual object that is a user interface virtual object; and provide the rendering of the second virtual object to the display device for displaying the second virtual object on the transparent screen such that the second virtual object is superimposed in the view of the physical environment of the user to be within or proximate to the second visually-demarked region.

Embodiment 23 is the system of embodiment 22, wherein the user input is received from a spatially-tracked physical pointing device.

Embodiment 24 is the system of embodiment 23, wherein the virtual object is a first virtual object, and wherein the instructions are further to render a second virtual object that is a virtual component of the physical pointing device, wherein the virtual component extends from the physical pointing device.

Embodiment 25 is the system of any one of embodiments 21-24, wherein the second visually-demarked region and the first visually-demarked region are the same.

Embodiment 26 is the system of any one of embodiments 17-25, wherein the physically visually-demarked region is visually contrasted from another region of the surface, elevated above another region of the surface, or delineated within the surface by a physically visible outline.

Embodiment 27 is the system of any one of embodiments 17-26, wherein the surface is a table and the visually-demarked region is a physically distinct surface portion of the table.

Embodiment 28 is the system of any one of embodiments 17-27, wherein the instructions to provide the rendering of the virtual object to the display device for displaying the virtual object on the transparent screen include instructions to:

identify, based on i) the identified location and orientation of the display device within the physical environment and ii) the identified location and orientation of the visually-demarked region, a location and orientation on the transparent screen for superimposing the rendering of the virtual object.

Embodiment 29 is the system of any one of embodiments 17-28, wherein the instructions are further to:

identify a second user input related to interaction of a second user with a second visually-demarked region in a second physical environment that is separate from the first physical environment; and update, in response to the second user input, the rendering of the virtual object.

Embodiment 30 is a system comprising:

a first capture device to capture a first image of a physical environment;

a second capture device to capture a second image of the physical environment; and one or more storage devices storing instructions that are operable, when executed by one or more processors of the system, to cause the one or more processors to:

obtain a first image of the physical environment as captured by the first capture device, obtain a second image of the physical environment as captured by the second capture device, identify a visually-demarked region on a surface in the physical environment as depicted in the first image, identify the visually-demarked region on the surface in the physical environment as depicted in the second image, process the first image to generate a first composite image of the physical environment that includes a depiction of a virtual object, wherein:

a location of the depiction of the virtual object in the first composite image is based on a location of the depiction of the visually-demarked region in the first image, such that the virtual object is depicted to be within a volume defined according to the visually-demarked region, and generating the first composite image comprises processing data representing the virtual object according to a first filter, process the second image to generate a second composite image of the physical environment that includes a depiction of the virtual object, wherein:

a location of the depiction of the virtual object in the second composite image is based on the location of the depiction of the visually-demarked region in the second image, such that the virtual object is depicted to be within the volume defined according to the visually-demarked region, and generating the second composite image comprises processing data representing the virtual object according to a second filter that is different than the first filter, cause the first composite image to be displayed for a first user, and cause the second composite image to be displayed for a second user.

Embodiment 31 is a method comprising the operations of any one of embodiments 1 to 30.

Embodiment 32 is a computer storage medium encoded with a computer program, the program comprising instructions that are operable, when executed by data processing apparatus, to cause the data processing apparatus to perform the operations of any one of embodiments 1 to 30.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system comprising:
a first stereoscopic viewing device configured for a first user to view a first pair of views of a first physical environment from a first perspective;
a second stereoscopic viewing device configured for a second user to view a second pair of views of the first physical environment from a second perspective;
a third stereoscopic viewing device configured for a third user to view a third pair of views of a second physical environment from a third perspective, wherein the second physical environment is physically separate from the first physical environment; and
one or more storage devices storing instructions that are operable, when executed by one or more processors of the system, to cause the one or more processors to:
obtain first data representing a first three-dimensional virtual object, obtain second data representing a second three-dimensional virtual object, wherein the second three-dimensional virtual object is for overlaying the first three-dimensional virtual object,
based on a sensor data received from a sensor, identify a first physically visually-demarked region of a first surface in the first physical environment, wherein the first physically visually-demarked region is smaller than the first surface,
identify spatial characteristics of the first physically visually-demarked region on the first surface within the first physical environment,
determine, using the spatial characteristics of the first physically visually-demarked region, spatial characteristics of a first virtual volume within the first physical environment;
generate a first rendered image pair from the first perspective, including generating a depiction of (i) the first three-dimensional virtual object and (ii) the second three-dimensional virtual object overlaid on the first three-dimensional virtual object, wherein a location of the first three-dimensional virtual object in the first rendered image pair is based on the spatial characteristics of the first virtual volume, such that the first virtual object is depicted to be exclusively within the first virtual volume,
at a first viewing surface positioned between the first physically visually-demarked region and the first perspective, overlay the first rendered image pair onto the first pair of views of the first stereoscopic viewing device,
generate a second rendered image pair from the second perspective, including generating a second perspective depiction of the first three-dimensional virtual object, wherein a location of the first three-dimensional virtual object in the second rendered image pair is based on the spatial characteristics of the first virtual volume, such that the first virtual object is depicted to be exclusively within the first virtual volume,
at a second viewing surface positioned between the first physically visually-demarked region and the second perspective, overlay the second rendered image pair onto the second pair of views of the second stereoscopic viewing device,
based on data received from a second sensor, identify a third physically visually-demarked region of a second surface within the second physical environment,
identify spatial characteristics of the third physically visually-demarked region on the second surface within the second physical environment,
determine, using the spatial characteristics of the third physically visually demarked region, spatial characteristics of a second virtual volume within the second physical environment,
generate a third rendered image pair from the third perspective, including generating a third perspective depiction of the first three-dimensional virtual object, wherein a location of the first three-dimensional virtual object in the third rendered image pair is based on the spatial characteristics of the second virtual volume, such that the first virtual object is depicted to be exclusively within the second virtual volume, and
at a third viewing surface positioned between the third physically visually-demarked region and the third perspective, overlay the third rendered image pair onto the third pair of views of the third stereoscopic viewing device.

2. The system of claim 1, wherein the instructions to identify a first physically visually-demarked region of a first surface in the first physical environment comprise instructions to:
obtain a stereoscopic image of the first physical environment as captured by a capture device corresponding to the first stereoscopic viewing device, process the stereoscopic image to identify the first physically visually-demarked region as depicted in the image.

3. The system of claim 2, wherein the instructions to process the stereoscopic image comprise instructions to process the stereoscopic image using a machine learning model that is configured to identify the first physically visually-demarked region in images.

4. The system of claim 2, wherein the instructions to process the stereoscopic image comprises instructions to:

obtain third data that characterizes a location and orientation of the capture device within the first physical environment, obtain fourth data that characterizes a location and orientation of the first physically visually-demarked region within the first physical environment, and identify, based on the first data and the second data, a depiction of the first physically visually-demarked region in the stereoscopic image.

5. The system of claim 4, wherein the fourth data is obtained from one or more sensors proximate to the first physically visually-demarked region.

6. The system of claim 2, wherein:
the instructions to generate a first rendered image pair from the first perspective comprise instructions to process the stereoscopic image to generate a stereoscopic composite image of the first physical environment that includes a depiction of the first virtual object, wherein a location of the depiction of the first virtual object is based on the spatial characteristics of the first virtual volume, such that the first virtual object is depicted to be within the first virtual volume, and the instructions to overlay the first rendered image pair onto the first pair of views of the first stereoscopic viewing device comprises instructions to cause the stereoscopic composite image to be displayed on the first stereoscopic viewing device.

7. The system of claim 1, wherein the instructions to identify a first physically visually-demarked region of a first surface in the first physical environment comprise instructions to obtain third data that characterizes a location and orientation of the first physically visually-demarked region within the first physical environment.

8. The system of claim 7, wherein the third data is obtained from one or more sensors proximate to the first physically visually-demarked region.

9. The system of claim 7, wherein the third data is obtained from a centralized tracking system in the first physical environment.

10. The system of claim 7, wherein:
the first stereoscopic display device includes a transparent screen through which a user can view the first physical environment, the instructions to generate a first rendered image pair from the first perspective comprise instructions to:
obtain fourth data characterizing a location and orientation of the first stereoscopic viewing device within the first physical environment, and process (i) the first data representing the first virtual object and (ii) the fourth data characterizing the location and orientation of the first stereoscopic viewing device to generate a stereoscopic rendering of the first virtual object, and the instructions to overlay the first rendered image pair onto the first pair of views of the first stereoscopic viewing device comprises instructions to:
provide the stereoscopic rendering of the first virtual object to the first stereoscopic viewing device for displaying the first virtual object on the transparent screen such that the first virtual object is superimposed in a view of the first physical environment of the user to be within the first virtual volume.

11. The system of claim 10, wherein the instructions to provide the stereoscopic rendering of the first virtual object to the first stereoscopic viewing device comprise instructions to:

identify, based on i) the location and orientation of the first stereoscopic viewing device within the first physical environment and ii) the location and orientation of the first physically visually-demarked region, a location and orientation on the transparent screen for superimposing the stereoscopic rendering of the first virtual object.

12. The system of claim 1, wherein a perimeter of a projection of the first virtual volume onto the first surface in the first physical environment matches a perimeter of the first physically visually-demarked region.

13. The system of claim 1, wherein the first physically visually-demarked region is visually contrasted from another region of the first surface, elevated above another region of the first surface, or delineated within the first surface by a physically visible outline.

14. The system of claim 1, wherein the first surface is a table and the first physically visually-demarked region is a physically distinct surface portion of the table.

15. The system of claim 1, wherein the instructions are further to cause the one or more processors to:
identify a user input that characterizes an interaction of the first user with a second third physically visually-demarked region in the first physical environment; and
update, in response to the user input, the first rendered image pair.

16. The system of claim 15, wherein the third physically visually-demarked region includes, in the first rendered image pair, a depiction of a second virtual object that is a user interface virtual object.

17. The system of claim 15, wherein the user input is received from a spatially-tracked physical pointing device.

18. The system of claim 17, wherein the instructions are further to render a third three-dimensional virtual object that is a virtual component of the physical pointing device, wherein the virtual component extends from the physical pointing device.

19. The system of claim 15, wherein the third physically visually-demarked region is a touch-enabled region.

20. The system of claim 15, wherein the third physically visually-demarked region and the first physically visually-demarked region are the same.

21. The system of claim 1, wherein the instructions are further to:
identify a second user input that characterizes an interaction of the third user with a fourth physically, visually-demarked region in the second physical environment; and
update, in response to the second user input, the first rendered image pair.

22. The system of claim 1, wherein:
the instructions are further to obtain seventh data representing a fourth three-dimensional virtual object, wherein the fourth three-dimensional virtual object is for overlaying the first three-dimensional virtual object and wherein the fourth three-dimensional virtual object is different from the second three-dimensional virtual object; and
the instructions to generate a third rendered image pair comprises instructions to generate a depiction of (i) the first three-dimensional virtual object and (ii) the fourth three-dimensional virtual object overlaid on the first three-dimensional virtual object.

23. A computer program product, tangibly embodied in non-transitory computer readable media, comprising instructions to cause one or more processors to:

obtain first data representing a first three-dimensional virtual object, obtain second data representing a second three-dimensional virtual object, wherein the second three-dimensional virtual object is for overlaying the first three-dimensional virtual object, based on a sensor data received from a sensor, identify a physically visually-demarked region of a first surface in a first physical environment, wherein the physically visually-demarked region is smaller than the first surface, identify spatial characteristics of the physically visually-demarked region on the first surface within the first physical environment, determine, using the spatial characteristics of the physically visually-demarked region, spatial characteristics of a first virtual volume within the first physical environment;

generate a first rendered image pair from a first perspective, including generating a depiction of (i) the first three-dimensional virtual object and (ii) the second three-dimensional virtual object overlaid on the first three-dimensional virtual object, wherein a location of the first three-dimensional virtual object in the first rendered image pair is based on the spatial characteristics of the first virtual volume, such that the first virtual object is depicted to be exclusively within the first virtual volume, at a first viewing surface positioned between the physically visually-demarked region and the first perspective, overlay the first rendered image pair onto a first pair of views of a first stereoscopic viewing device, generate a second rendered image pair from a second perspective, including generating a second perspective depiction of the first three-dimensional virtual object, wherein a location of the first three-dimensional virtual object in the second rendered image pair is based on the spatial characteristics of the virtual volume, such that the first virtual object is depicted to be exclusively within the first virtual volume, at a second viewing surface positioned between the physically visually-demarked region and the second perspective, overlay the second rendered image pair onto a second pair of views of a second stereoscopic viewing device, based on data received from a second sensor, identify a second physically visually-demarked region of a second surface within a second physical environment, identify spatial characteristics of the second physically visually-demarked region on the second surface within the second physical environment, determine, using the spatial characteristics of the second physically visually-demarked region, spatial characteristics of a second virtual volume within the second physical environment, generate a third rendered image pair from a third perspective, including generating a third perspective depiction of the first three-dimensional virtual object, wherein a location of the first three-dimensional virtual object in the third rendered image pair is based on the spatial characteristics of the second virtual volume, such that the first virtual object is depicted to be exclusively within the second virtual volume, and at a third viewing surface positioned between the second physically visually-demarked region and the third perspective, overlay the third rendered image pair onto a third pair of views of a third stereoscopic viewing device.

* * * * *

UNITED STATES PATENT AND TRADEMARK OFFICE
CERTIFICATE OF CORRECTION

Page 1 of 1

PATENT NO. : 11,057,612 B1
APPLICATION NO. : 17/125798
DATED : July 6, 2021
INVENTOR(S) : Nancy L. Clemens and Michael A. Vesely It is certified that error appears in the above-identified patent and that said Letters Patent is hereby corrected as shown below:

On the Title Page

Column 1, item (54) and in the Specification, Column 1, Lines 1-4, delete "USUALLY" and insert --USING--, therefor.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*